US011325188B2

(12) United States Patent
McMurtry et al.

(10) Patent No.: US 11,325,188 B2
(45) Date of Patent: *May 10, 2022

(54) ADDITIVE MANUFACTURING APPARATUS AND METHOD

(71) Applicant: RENISHAW PLC, Wotton-under-Edge (GB)

(72) Inventors: David Roberts McMurtry, Stancombe (GB); Marc Dimter, Kornwestheim (DE); Ralph Mayer, Kornwestheim (DE)

(73) Assignee: RENISHAW PLC, Wotton-Under-Edge (GB)

( * ) Notice: Subject to any disclaimer, the term of this patent is extended or adjusted under 35 U.S.C. 154(b) by 5 days.

This patent is subject to a terminal disclaimer.

(21) Appl. No.: 16/285,782

(22) Filed: Feb. 26, 2019

(65) Prior Publication Data

US 2019/0184463 A1    Jun. 20, 2019

Related U.S. Application Data

(62) Division of application No. 14/897,731, filed as application No. PCT/GB2014/051792 on Jun. 11, 2014, now Pat. No. 10,252,333.

(30) Foreign Application Priority Data

Jun. 11, 2013  (GB) ...................................... 1310398
Aug. 5, 2013   (GB) ...................................... 1313970

(51) Int. Cl.
  *B22F 10/20*    (2021.01)
  *B29C 64/153*   (2017.01)
  (Continued)

(52) U.S. Cl.
  CPC ............ *B22F 10/20* (2021.01); *B29C 64/153* (2017.08); *B29C 64/371* (2017.08); *B22F 10/30* (2021.01);
  (Continued)

(58) Field of Classification Search
  CPC .............................. B29C 64/35; B29C 64/153
  See application file for complete search history.

(56) References Cited

U.S. PATENT DOCUMENTS 6,215,093 B1    4/2001   Meiners et al.
6,534,740 B1    3/2003   Meiners et al.
(Continued)

FOREIGN PATENT DOCUMENTS

CN     1347783 A     5/2002
CN     1608832 A     4/2005
(Continued)

OTHER PUBLICATIONS

Jul. 2, 2014 Search Report issued in Great Britain Patent Application No. 1310398.1.
(Continued)

*Primary Examiner* — Nicholas R Krasnow
(74) *Attorney, Agent, or Firm* — Oliff PLC

(57) ABSTRACT

This invention concerns an additive manufacturing apparatus for building objects by layerwise consolidation of material. The apparatus includes a build chamber containing a working area, a high energy beam for consolidating material deposited in the working area in layers and a flow device for generating a gas flow across at least a part of the working area from a gas inlet to a gas outlet. The gas inlet and gas outlet are arranged to be movable within the build chamber.

17 Claims, 20 Drawing Sheets

(51) Int. Cl.
*B29C 64/371* (2017.01)
*B22F 10/30* (2021.01)
*B33Y 10/00* (2015.01)
*B33Y 30/00* (2015.01)
*B33Y 40/00* (2020.01)
*B33Y 50/02* (2015.01)

(52) U.S. Cl.
CPC ....... *B22F 2201/00* (2013.01); *B22F 2203/00* (2013.01); *B22F 2999/00* (2013.01); *B33Y 10/00* (2014.12); *B33Y 30/00* (2014.12); *B33Y 40/00* (2014.12); *B33Y 50/02* (2014.12); *Y02P 10/25* (2015.11)

(56) References Cited

U.S. PATENT DOCUMENTS

| | | | |
|---|---|---|---|
| 6,932,935 | B1 | 8/2005 | Oberhofer et al. |
| 9,442,179 | B2 | 9/2016 | Do et al. |
| 10,252,333 | B2* | 4/2019 | McMurtry ............... B22F 10/20 |
| 2005/0116391 | A1 | 6/2005 | Lindemann et al. |
| 2005/0142024 | A1 | 6/2005 | Herzog |
| 2007/0210040 | A1 | 9/2007 | Sakamoto et al. |
| 2008/0241392 | A1 | 10/2008 | Dimter et al. |
| 2011/0135840 | A1 | 6/2011 | Doye et al. |
| 2011/0220625 | A1 | 9/2011 | Pluss |
| 2012/0126457 | A1 | 5/2012 | Abe et al. |
| 2013/0064707 | A1 | 3/2013 | Matsui et al. |
| 2013/0101728 | A1 | 4/2013 | Keremes et al. |
| 2013/0112672 | A1 | 5/2013 | Keremes et al. |
| 2014/0175708 | A1 | 6/2014 | Echigo et al. |
| 2016/0279706 | A1* | 9/2016 | Domrose ............... B33Y 10/00 |
| 2016/0368052 | A1* | 12/2016 | Jakimov ............... B29C 64/214 |

FOREIGN PATENT DOCUMENTS

| | | |
|---|---|---|
| CN | 101032786 A | 9/2007 |
| CN | 201235608 Y | 5/2009 |
| CN | 102189335 A | 9/2011 |
| CN | 102438779 A | 5/2012 |
| CN | 102990932 A | 3/2013 |
| DE | 29824994 U1 | 1/2004 |
| DE | 102004031881 A1 * | 1/2006 ........... B29C 64/153 |
| DE | 102004031881 A1 | 1/2006 |
| DE | 102005014483 A1 | 10/2006 |
| EP | 1 993 812 B1 | 7/2011 |
| EP | 2431113 A1 | 3/2012 |
| EP | 2583773 A2 | 4/2013 |
| JP | 2002-115004 A | 4/2002 |
| JP | 005-105414 A | 4/2005 |
| JP | 2006-150977 A | 6/2006 |
| JP | 2010-280173 A | 12/2010 |
| JP | 2016-518584 A | 6/2016 |
| WO | 92/08592 A1 | 5/1992 |
| WO | 2010/007396 A1 | 1/2010 |
| WO | 2014/154878 A1 | 10/2014 |
| WO | 22014/154879 A1 | 10/2014 |
| WO | 2014/199134 A1 | 12/2014 |
| WO | 2014/199150 A1 | 12/2014 |

OTHER PUBLICATIONS

Jan. 30, 2014 Search Report issued in Great Britain Patent Application No. 1313970.4.
Sep. 22, 2014 Search Report issued in International Patent Application No. PCT/GB2014/051792.
Sep. 22, 2014 Written Opinion issued in International Patent Application No. PCT/GB2014/051792.
Nov. 22, 2016 Office Action issued in Chinese Patent Application No. 201480044236.3.
Oct. 13, 2017 Office Action issued in Chinese Application No. 201480044236.3.
U.S. Appl. No. 61/774,215, filed Mar. 15, 2013 in the name of Ben Ferrar.
U.S. Appl. No. 61/791,636, filed Mar. 15, 2013 in the name of Ben Ferrar.
Youtube, "Direct Metal Laser Sintering System Precious M 080 by CPM and EOS," https://www.youtube.com/watch?v=DBsBo91shYM, Jan. 22, 2013, 7 pages.
Jun. 26, 2018 Office Action issued in Japanese Patent Application No. 2016-518584.
Oct. 23, 2018 Office Action issued in Japanese Patent Application No. 2016-518584.
Mar. 16, 2018 Office Action issued in U.S. Appl. No. 14/897,731.

* cited by examiner

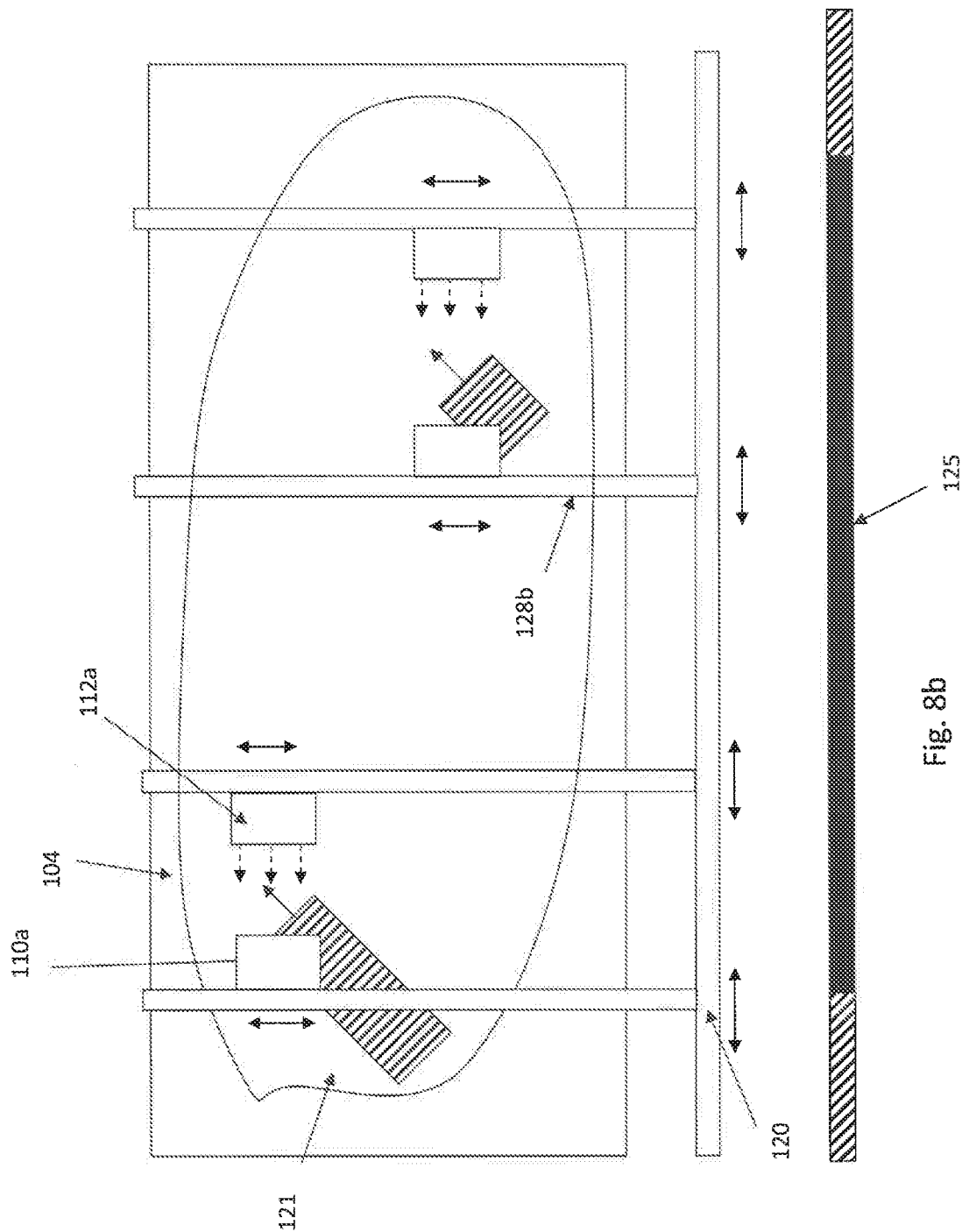

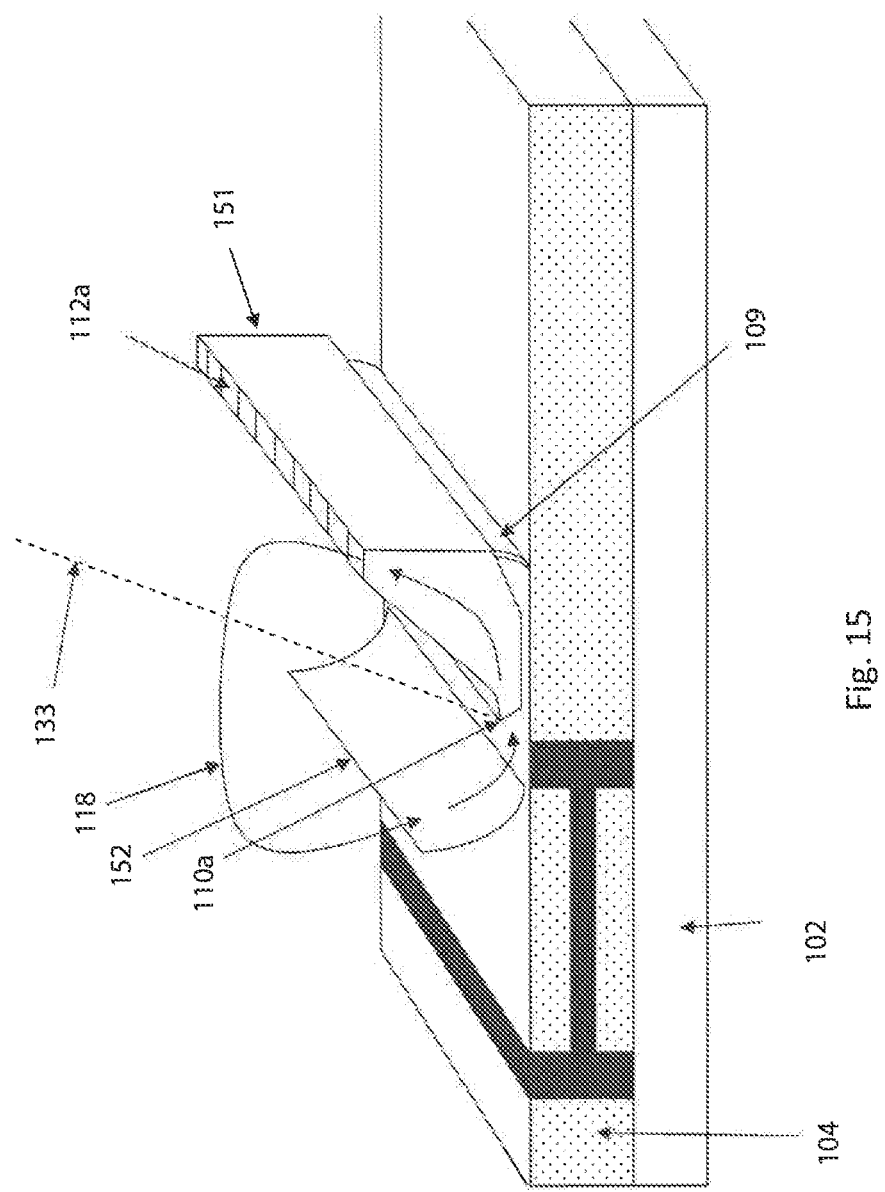

ADDITIVE MANUFACTURING APPARATUS AND METHOD

CROSS-REFERENCE TO RELATED APPLICATIONS

This application is a divisional of U.S. application Ser. No. 14/897,731 filed Dec. 11, 2015, which is a national stage application of PCT/GB2014/051792 filed Jun. 11, 2014, which is based on and claims priority under 35 U.S.C. 119 from Great Britain Patent Application No. 1310398.1 filed on Jun. 11, 2013 and Great Britain Patent Application No. 1313970.4 filed on Aug. 5, 2013. The contents of the above applications are incorporated herein by reference in their entirety.

SUMMARY OF INVENTION

This invention concerns an additive manufacturing apparatus and method. The invention has particular, but not exclusive, application to providing gas flow across a powder bed in a laser solidification apparatus.

BACKGROUND

Additive manufacturing or rapid prototyping methods for producing objects comprise layer-by-layer solidification of a material, such as a metal powder material, using a high energy beam, such as a laser beam or electron beam. A powder layer is deposited on a powder bed in a build chamber and a laser beam is scanned across portions of the powder layer that correspond to a cross-section of the object being constructed. The laser beam melts or sinters the powder to form a solidified layer. After selective solidification of a layer, the powder bed is lowered by a thickness of the newly solidified layer and a further layer of powder is spread over the surface and solidified, as required.

During the melting or sintering process, debris (e.g. condensate, unsolidified particles of powder etc) is produced within the build chamber. It is known to introduce a gas flow through the build chamber in an attempt to remove debris from the chamber in the gas flow. For example, the M280 model of machine produced by EOS GmbH, Munich, Germany comprises a series of gas outlet nozzles located in the build chamber to the rear of the powder bed that pass a flow of gas to a series of exhaust vents that are located in the build chamber at the front of the powder bed. In this manner, a planar layer of gas flow is created at the surface of the powder bed. A similar arrangement is provided in Renishaw's AM250 and AM125 machines, wherein apertures in the build chamber either side of a powder bed provide substantially planar gas flow across the powder bed.

A problem with the gas flow generated by such arrangements is that the gas flow may not be sufficient to carry all debris to the exhaust vents and some of the debris may be blown onto powder that has yet to be scanned. This can result in the object being built inaccurately. For example, the debris blown onto the powder can solidify to the object being built resulting in a solid projection from the bed that contacts a wiper blade when the wiper spreads the next layer of powder. This projection can cause damage to the wiper blade, which in turn, can result in subsequent layers of powder having a ridge at a location corresponding to the area of the wiper blade that is damaged. These ridges are created in each layer for the rest of the build, affecting the accuracy with which the object is built.

Furthermore, it is known to vary the direction in which the laser is scanned for different layers and/or for different portions of a layer, for example, see US2008/0241392 and US2005/0142024. It may be desirable to scan the laser in a particular direction based on gas flow direction, for example as set out in patent applications U.S. 61/791,636 and U.S. 61/774,215, which are incorporated herein by reference. However, with the apparatus described above, it may be necessary to compromise between optimum scan direction based on gas flow direction and the desire to change the scan direction for different layers and/or different portions of a layer.

U.S. Pat. No. 6,215,093 describes apparatus wherein a nozzle for providing a protective gas stream travels together with the laser beam.

SUMMARY OF INVENTION

According to a first aspect of the invention there is provided additive manufacturing apparatus for building objects by layerwise consolidation of material, the apparatus comprising a build chamber containing a working area, a high energy beam for consolidating material deposited in the working area in layers and a flow device for generating a gas flow across at least a part of the working area from a gas inlet to a gas outlet, the gas inlet and gas outlet arranged to be movable within the build chamber.

By providing a movable gas inlet and gas outlet, the locations of the gas inlet and outlet can be altered based upon the scan path of the beam across the working area. For example, the locations of the gas inlet and outlet may be changed based on a direction in which a series of successive hatch lines are progressed and/or to move with the progression of the scan such that the gas inlet and gas outlet can be located closer to the impact point of the beam on the material.

It will be understood that the term "scan" used herein is not limited to continuously running a spot of the high energy beam over a surface but includes a series of separated discrete exposures (or hops). For example, optics may direct the high energy beam to expose a first location to the beam, the beam then turned off and the optics reoriented to direct the energy beam to a second location spaced from the first location when the high energy beam is switched back on. The high energy beam is a beam having sufficient energy to consolidate the material.

The gas inlet and gas outlet may be movable together such that the relative positions of the gas inlet and gas outlet remain fixed. For example, the gas inlet and outlet may be built as a single movable unit.

Alternatively, the gas inlet is movable separately from the gas outlet. The gas inlet and gas outlet may be movable such that the distance between the gas inlet and gas outlet can be varied. In particular, the gas inlet and gas outlet may be movable such that the distance between the gas inlet and gas outlet can be less than a width of a working area, such as defined by a build platform, in which an object is built. In this way, the gas inlet and gas outlet can be located closer together than for nozzles fixed either side of the build platform such that a more uniform gas flow may be achieved and debris ejected from the area being consolidated are more likely to be captured by the gas flow and carried to the gas outlet. The apparatus may comprise a gas flow device for controlling the gas flow through the inlet and/or outlet based upon the distance between the gas inlet and gas outlet.

The gas inlet and gas outlet may be mounted on an assembly for moving the inlet and outlet along at least one linear axis and, additionally, may be mounted on an assembly for rotating the inlet and outlet about at least one rotary axis. Rotating the gas inlet and gas outlet may allow one to change the direction of gas flow based upon the scan direction. The movement may be controlled by a computer at the object is built.

The gas inlet and/or gas outlet may comprise an elongate aperture that extends across an entire width of the working area, the gas inlet and/or gas outlet movable in a linear direction perpendicular to a longitudinal axis of the aperture. Such an arrangement may move in only one linear direction as the aperture provides flow across the entire width of the working area.

However, in another embodiment, the gas inlet and/or gas outlet may comprise an aperture that extends across less than a width of the working area, the gas inlet and/or gas outlet movable in a linear direction perpendicular to a gas flow direction from the gas inlet/into the gas outlet. In this way, a smaller gas inlet or outlet can be provided whilst full coverage of the working area may still be achieved through movement of gas inlet and/or outlet in a direction perpendicular to the gas flow direction. A smaller gas inlet and/or outlet may be beneficial as it may result in a lighter unit that can be moved more quickly over the working area than a larger unit that extends across the entire working area.

Preferably, the apparatus is a selective laser solidification, such as melting (SLM) or sintering (SLS), apparatus, wherein powder layers are successively deposited across the working area in the build chamber and a laser beam is scanned across portions of each powder layer that correspond to a cross-section of the object being constructed to consolidate the portions of the powder.

The apparatus may further comprise a wiper for spreading powder across the working area. The wiper may be mounted to move with at least one of the gas inlet and gas outlet. In this way, the powder may be simultaneously spread across the working area with movement of the gas inlet and/or gas outlet. The wiper (which is mounted to move with at least one of the gas inlet and gas outlet) may be movable from an extended position, in which the wiper engages the powder, to a retracted position, in which the wiper is held clear of the powder. In this way, the gas inlet and/or gas outlet can be moved both with and without spreading powder by moving the wiper between the extended and retracted positions.

The apparatus may further comprise a probe for measuring geometry of the object being built, the probe mounted to move on an axis common with the gas inlet and/or gas outlet. The gas inlet and/or gas outlet that is mounted on a common axis with the probe may be arranged to move in a first direction, such as a first linear direction, and the probe is arranged to move in the first direction and in a further direction, such as a further linear direction perpendicular to the first linear direction. The probe may be a contact probe, such as a scanning or touch probe, or a non-contact probe, such as a video probe.

The gas inlet is for propelling gas into the build chamber and the gas outlet is for drawing gas from the build chamber. The apparatus may comprise a controller for controlling a rate of flow at which gas is propelled into the build chamber from the gas inlet based upon a location of the gas inlet and/or gas outlet in the build chamber. The apparatus may comprise a controller for controlling a rate of flow at which gas is drawn from the build chamber through the gas outlet based upon a location of the gas inlet and/or gas outlet in the build chamber.

According to a second aspect of the invention there is provided an additive manufacturing method for building objects by layerwise consolidation of material, the method comprising depositing material in a working area in a build chamber, scanning a high energy beam across the working area to consolidate the material in layers and operating a flow device for generating a gas flow across at least a part of the working area from a gas inlet to a gas outlet comprising moving the gas inlet and the gas outlet during building of the object.

The method may comprise moving the gas inlet and gas outlet to vary the distance between the gas inlet and gas outlet.

The method may comprise moving the gas inlet and gas outlet to alter the direction of gas flow across the working area.

The method may comprise altering a rate of flow at which gas is propelled into the build chamber from the gas inlet based upon a location of the gas inlet and/or gas outlet in the build chamber. The method may comprise controlling a rate of flow at which gas is drawn from the build chamber through the gas outlet based upon a location of the gas inlet and/or gas outlet in the build chamber.

The method may comprise moving the gas inlet and gas outlet whilst scanning the material with the high energy beam. The inlet and outlet may be moved based upon the scan path of the high energy beam. For example, the gas inlet and gas outlet may be moved to track an impact point of the high energy beam with the material/in the working area.

The method may be a selective laser solidification method and may comprise successively depositing layers or powder across the working area and scanning the high energy beam across portions of each powder layer that correspond to a cross-section of the object being constructed to consolidate the portions of the powder.

According to a third aspect of the invention there is provided a data carrier having instructions thereon, the instructions, when executed by a processor, causing the processor to control an additive manufacturing apparatus according to the first aspect of the invention to carry out the method of the second aspect of the invention.

According to a fourth aspect of the invention there is provided additive manufacturing apparatus for building objects by layerwise consolidation of material, the apparatus comprising a build chamber containing a working area, a high energy beam for consolidating material deposited in the working area in layers, a first flow device for propelling gas into a volume above the working area and a second flow device for drawing gas from the volume so as to generate a gas flow between the first and second flow devices, at least one of the first flow device and second flow device arranged to be movable within the build chamber, and a control unit for controlling scanning of the material with the high energy beam in accordance with a predetermined scanning plan and controlling movement of the first and/or second flow device based upon the scanning plan.

According to a fifth aspect of the invention there is provided an additive manufacturing method for building objects by layerwise consolidation of material, the method comprising depositing material in a working area in a build chamber, scanning a high energy beam across the working area to consolidate the material in layers in accordance with a predetermined scanning plan and operating a first flow device for propelling gas into a volume above the working area, which includes the material being consolidated with the high energy beam, and a second flow device for drawing gas from the volume to generate a gas flow between the first and second flow devices, and further comprising moving at least one of the first and second flow devices within the build chamber during building of the object based upon the scanning plan.

According to a sixth aspect of the invention there is provided a data carrier having instructions thereon, the instructions, when executed by a processor, causing the processor to control an additive manufacturing apparatus according to the fourth aspect of the invention to carry out the method of the fifth aspect of the invention.

According to a seventh aspect of the invention there is provided additive manufacturing apparatus for building objects by layerwise consolidation of material, the apparatus comprising a build chamber containing a working area, a high energy beam for consolidating material deposited in the working area in layers, a first flow device for propelling gas into a volume above the working area and a second flow device for drawing gas from the volume so as to generate a gas flow between the first and second flow devices, the first and second flow devices arranged to be movable within the build chamber.

According to a eighth aspect of the invention there is provided an additive manufacturing method for building objects by layerwise consolidation of material, the method comprising depositing material in a working area in a build chamber, scanning a high energy beam across the working area to consolidate the material in layers and operating a first flow device for propelling gas into a volume above the working area, which includes the material being consolidated with the high energy beam, and a second flow device for drawing gas from the volume to generate a gas flow between the first and second flow devices, further comprising moving the first and second flow devices within the build chamber during building of the object.

According to a ninth aspect of the invention there is provided a data carrier having instructions thereon, the instructions, when executed by a processor, causing the processor to control an additive manufacturing apparatus according to the seventh aspect of the invention to carry out the method of the eighth aspect of the invention.

According to a tenth aspect of the invention there is provided additive manufacturing apparatus for building objects by layerwise consolidation of material, the apparatus comprising a build chamber containing a working area, a high energy beam for consolidating material deposited in the working area in layers, a probe for measuring geometry of the object being built, a first flow device for propelling gas into a volume above the working area and a second flow device for drawing gas from the volume so as to generate a gas flow between the first and second flow devices, wherein at least one of the first flow device and second flow device is arranged to be movable within the build chamber and the probe is mounted to move on an axis common with the gas inlet and/or gas outlet.

According to an eleventh aspect of the invention there is provided additive manufacturing apparatus for building objects by layerwise consolidation of material, the apparatus comprising a build chamber containing a working area, a high energy beam for consolidating material deposited in the working area in layers, a first flow device for propelling gas into a volume above the working area, a second flow device for drawing gas from the volume so as to generate a gas flow between the first and second flow devices, at least one of the first flow device and second flow device arranged to be movable within the build chamber, and a wiper for spreading powder across the working area, the wiper mounted to move with at least one of the first flow device and the second flow device.

According to a twelfth aspect of the invention there is provided an additive manufacturing method for building objects by layerwise consolidation of material, the method comprising depositing material in a working area in a build chamber, moving a wiper for spreading powder across the working area, scanning a high energy beam across the working area to consolidate the material in layers and operating a first flow device for propelling gas into a volume above the working area, which includes the material being consolidated with the high energy beam, and a second flow device for drawing gas from the volume to generate a gas flow between the first and second flow devices, the method further comprising moving at least one of the first and second flow devices during building of the object simultaneously with moving the wiper.

According to a thirteenth aspect of the invention there is provided a data carrier having instructions thereon, the instructions, when executed by a processor, causing the processor to control an additive manufacturing apparatus according to the eleventh aspect of the invention to carry out the method of the twelfth aspect of the invention.

According to a fourteenth aspect of the invention there is provided an additive manufacturing apparatus for building objects by layerwise consolidation of material, the apparatus comprising a build chamber containing a working area, a high energy beam for consolidating material deposited in the working area in layers, an optical module for directing the high energy beam on to the working area, a flow device for drawing gas from a volume above the working area so as to generate a gas flow across the working area, the flow device arranged to be movable within the build chamber, and a controller for controlling movement of the gas flow device and the optical module such that the flow device is moved during scanning of the working area with the high energy beam.

A gas outlet that draws gas from the build chamber may create a sufficient flow in the vicinity of the gas outlet such that debris created by solidification of the material is sufficiently removed. Accordingly, confining solidification to be within the vicinity of the outlet may allow greater freedom in the placement of the inlet because laminar flow between the inlet and outlet may no longer be required. For example, the inlet my propel gas in a direction that is not parallel with the working area and/or may have a fixed location within the build chamber.

The additive manufacturing apparatus may further comprise a guide for guiding gas drawn from the build chamber into the gas outlet, the guide movable within the build chamber. The guide may be movable together with the gas outlet. The guide may facilitate a desired circulation of gas within the build chamber.

The controller may be arranged to control the optical module to direct the high energy beam to a location between the guide and the gas outlet.

According to a fifteenth aspect of the invention there is provided an additive manufacturing apparatus for building objects by layerwise consolidation of material, the apparatus comprising a build chamber containing a working area, a high energy beam for consolidating material deposited in the working area in layers, an optical module for directing the high energy beam on to the working area, a flow device for propelling gas into and/or drawing gas from a volume above the working area so as to generate a gas flow across the working area, the flow device arranged to be movable within the build chamber, and a controller for controlling movement of the gas flow device and the optical module such that the flow device can be moved separately from movement of the high energy beam across the working area.

The flow device may be moved on a guide, such as a rail or track, by a first motor, the controller arranged for controlling the first motor to adjust the position of the flow device. The optical module may comprise an optical element, such as a lens or mirror, for directing the high energy beam to the desired location in the working area, the optical element mounted on an assembly for movement and a second motor for moving the optical element in the assembly, the controller arranged for controlling the second motor to adjust the position of the optical element. The controller may be arranged to control the first motor to move the flow device whilst the optical element remains stationary. The controller may be arranged to control the second motor to move the optical element whilst the flow device remains stationary.

This may be desirable for certain scanning strategies and/or operative conditions of the apparatus, wherein movement of the flow device and optical element together is not required. For example, when carrying out a border scan of the object, it may be desirable for the flow device to be fixed at a specified location for the duration of the border scan. Furthermore, in-between the scanning of layers it may be desirable to move the flow device to a location outside of the working area such that a wiper or the like can pass over the working area.

The data carrier of the above aspects of the invention may be a suitable medium for providing a machine with instructions such as non-transient data carrier, for example a floppy disk, a CD ROM, a DVD ROM/RAM (including −R/−RW and +R/+RW), an HD DVD, a BIu Ray™ disc, a memory (such as a Memory Stick™, an SD card, a compact flash card, or the like), a disc drive (such as a hard disk drive), a tape, any magneto/optical storage, or a transient data carrier, such as a signal on a wire or fibre optic or a wireless signal, for example a signals sent over a wired or wireless network (such as an Internet download, an FTP transfer, or the like).

DESCRIPTION OF THE DRAWINGS

FIG. 8b is a plan view of a gas flow device according to another embodiment of the invention;

FIG. 15 is a perspective view of a gas flow device according to yet another embodiment of the invention.

DESCRIPTION OF EMBODIMENTS

Figure 1:
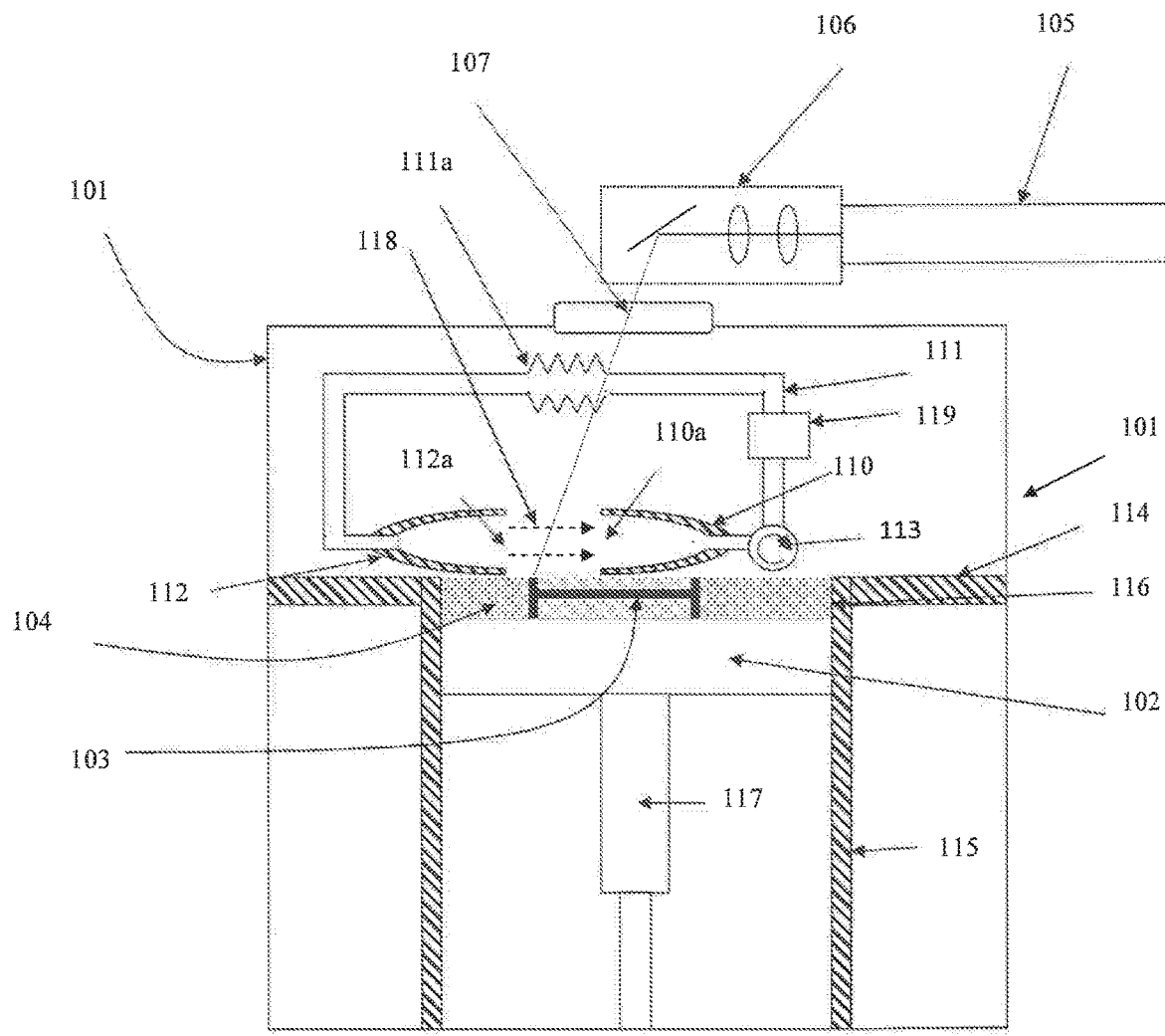
FIG. 1 is a schematic view of an additive manufacturing apparat according to one embodiment of the invention.
Figure 2:
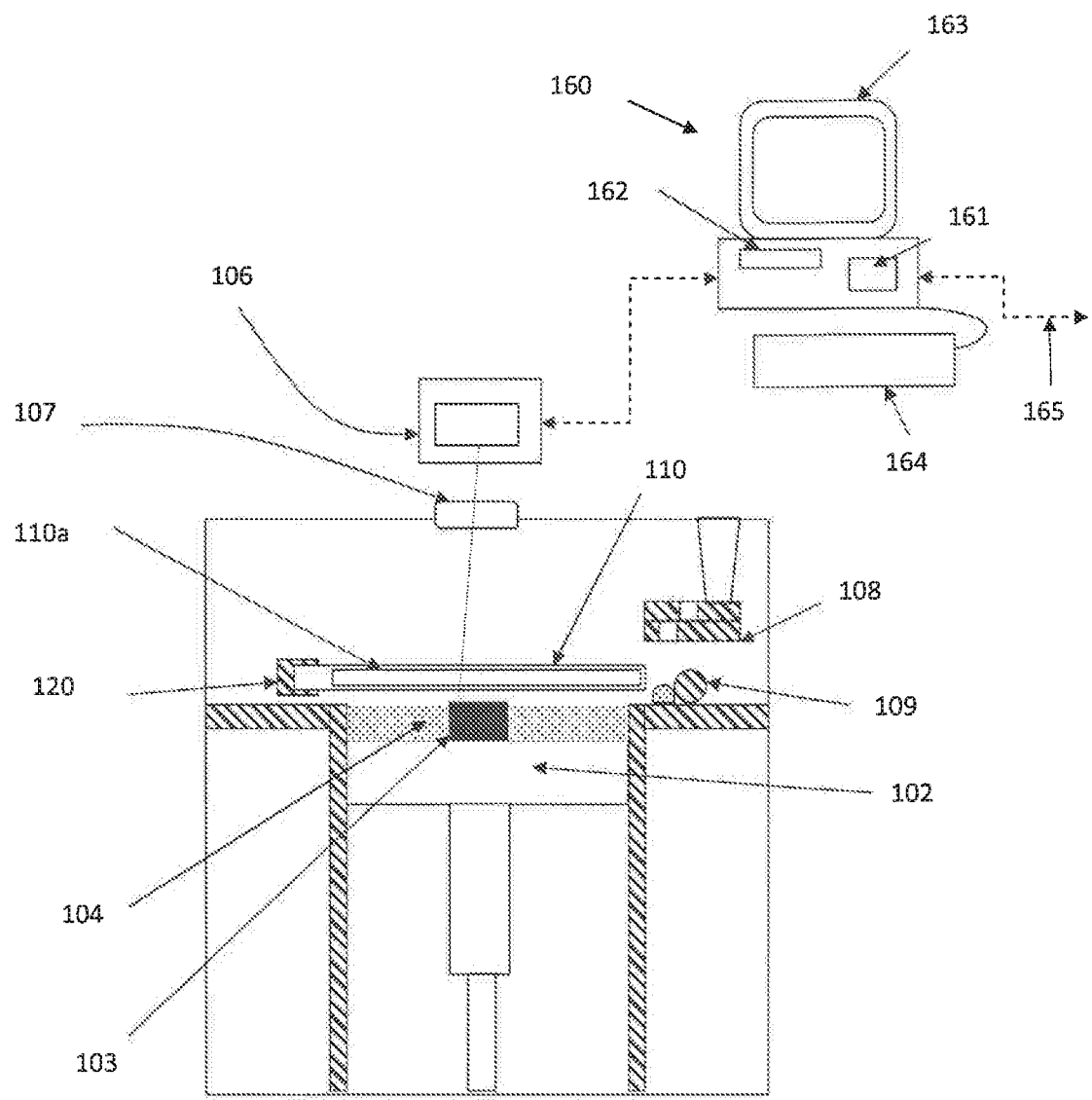
FIG. 2 is a schematic view of the additive manufacturing apparatus of FIG. 1 from another side.

Referring to FIGS. 1 and 2, a laser solidification apparatus according to an embodiment of the invention comprises a build chamber 101 having therein partitions 114, 115 that define a build volume 116 and a surface onto which powder can be deposited. A build platform 102 defines a working area in which an object 103 is built by selective laser melting powder 104. The platform 102 can be lowered within the build volume 116 using mechanism 117 as successive layers of the object 103 are formed. A build volume available is defined by the extent to which the build platform 102 can be lowered into the build volume 116. Layers of powder 104 are formed as the object 103 is built by dispensing apparatus 108 and a wiper 109. For example, the dispensing apparatus 109 may be apparatus as described in WO2010/007396. A laser module 105 generates a laser for melting the powder 104, the laser directed onto the powder bed 104 as required by optical module 106 under the control of a computer 160. The laser enters the chamber 101 via a window 107.

A gas flow device comprises a movable gas nozzle 112 comprising a gas inlet 112a and a movable gas exhaust 110 comprising a gas outlet 110a. The gas nozzle 112 and gas exhaust 110 are movable for generating a gas flow across a part or whole of the powder bed 104 formed on the build platform 102. The gas inlet 112a and gas outlet 110a produce a laminar flow having a flow direction from the inlet to the outlet, as indicated by arrows 118. Gas is re-circulated from the exhaust 110 to the nozzle 112 through a gas recirculation loop 111 that is also located within the chamber 116. A pump 113 maintains the desired gas pressure at gas inlet 112 and gas outlet 110. A filter 119 is provided in the recirculation loop 111 to filter from the gas condensate that has become entrapped in the flow. The recirculation unit 111 has means for changing the length of the gas recirculation loop with changes in the relative distance between the gas inlet 112a and gas outlet 110a. In FIGS. 1 and 2, bellows 111a are used to make the gas recirculation loop 111 adaptable to the changes in position of the nozzle 112 and exhaust 110.

Computer 160 comprises a processor unit 161, memory 162, display 163, user input device 164, such as a keyboard, touch screen, etc, a data connection to modules of the laser melting apparatus, such as optical module 106, laser module 105 and motors (not shown) that drive movement of the dispensing apparatus 108, wiper 109, build platform 102, nozzle 112 and exhaust 110. An external data connection 165 provides for the uploading of scanning instructions to the computer 160. The laser unit 105, optical unit 106, movable gas inlet 112 and gas outlet 110 of the flow device and movement of build platform 102 are controlled by the computer 160 based upon the scanning instructions.

A door 125 (shown in FIG. 3) is provided in the chamber 101 for removing the object therefrom on completion of the build.

Figure 3:
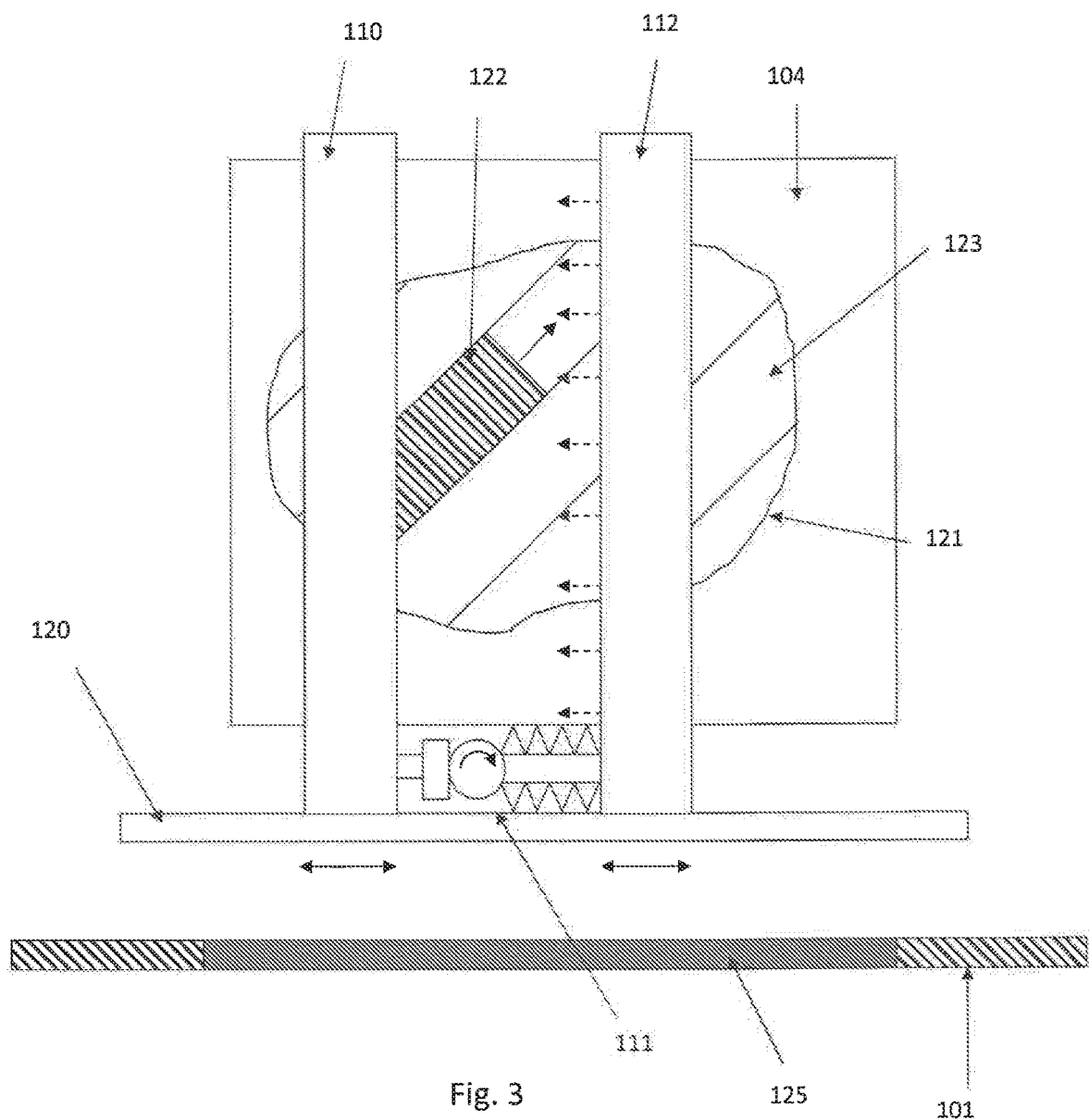
FIG. 3 is a plan view of a gas flow device of the apparatus during building of a core region of the object.

Referring to FIG. 3, the nozzle 112 and exhaust 110 are mounted on a guide 120, such as a rail or a track, to be movable along a linear axis. In use, the relative position of the nozzle 112 and exhaust 110 is altered based upon an area of the powder bed 104 being scanned and a scanning strategy being used. For example, in FIG. 3, a stripe scanning strategy is being used wherein an inner region of a section 121 of an object 103 is scanned by raster scans 122 that are progressed across the section 121 within a series of striped regions 123. The nozzle 112 and exhaust 110 are moved to follow the laser beam as it makes the scan across the section 121. The gas inlet 112a of the nozzle 112 and the gas outlet 110a of the exhaust 110 are located within the periphery of the powder bed 104 and, preferably, are maintained substantially a constant distance apart during the scanning of the stripes.

Figure 4A:
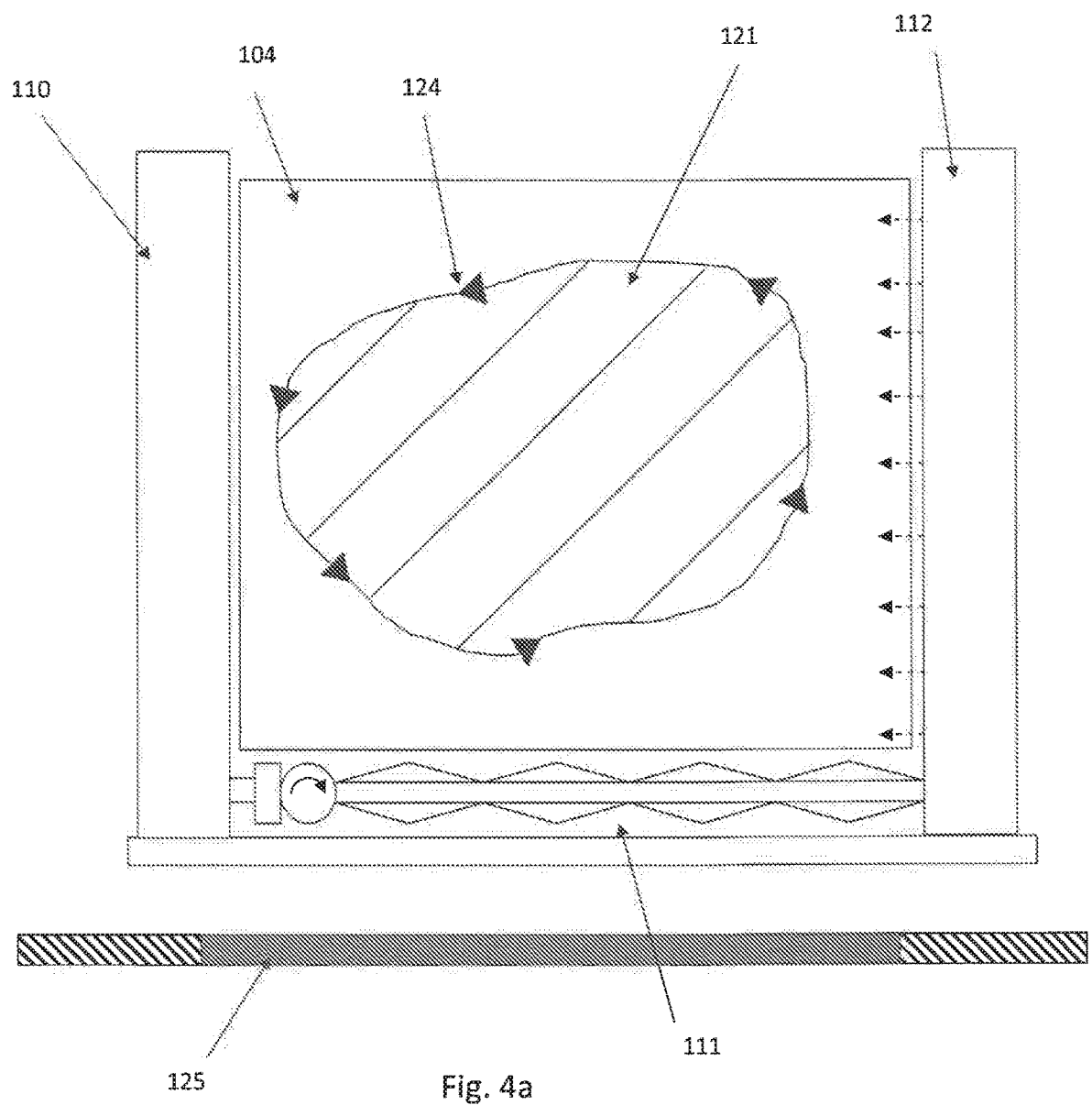
FIG. 4a is a plan view of the gas flow device during building of a peripheral region of the object.

After the scanning of the stripes 123, a border scan 124 may be carried out around the outside of the section 121. This is shown in FIG. 4a. During the border scan 124, the exhaust 110 and nozzle 112 may be located far enough apart such that the entire border scan can be completed without further movement of the nozzle 112 and exhaust 110.

Figure 4B:
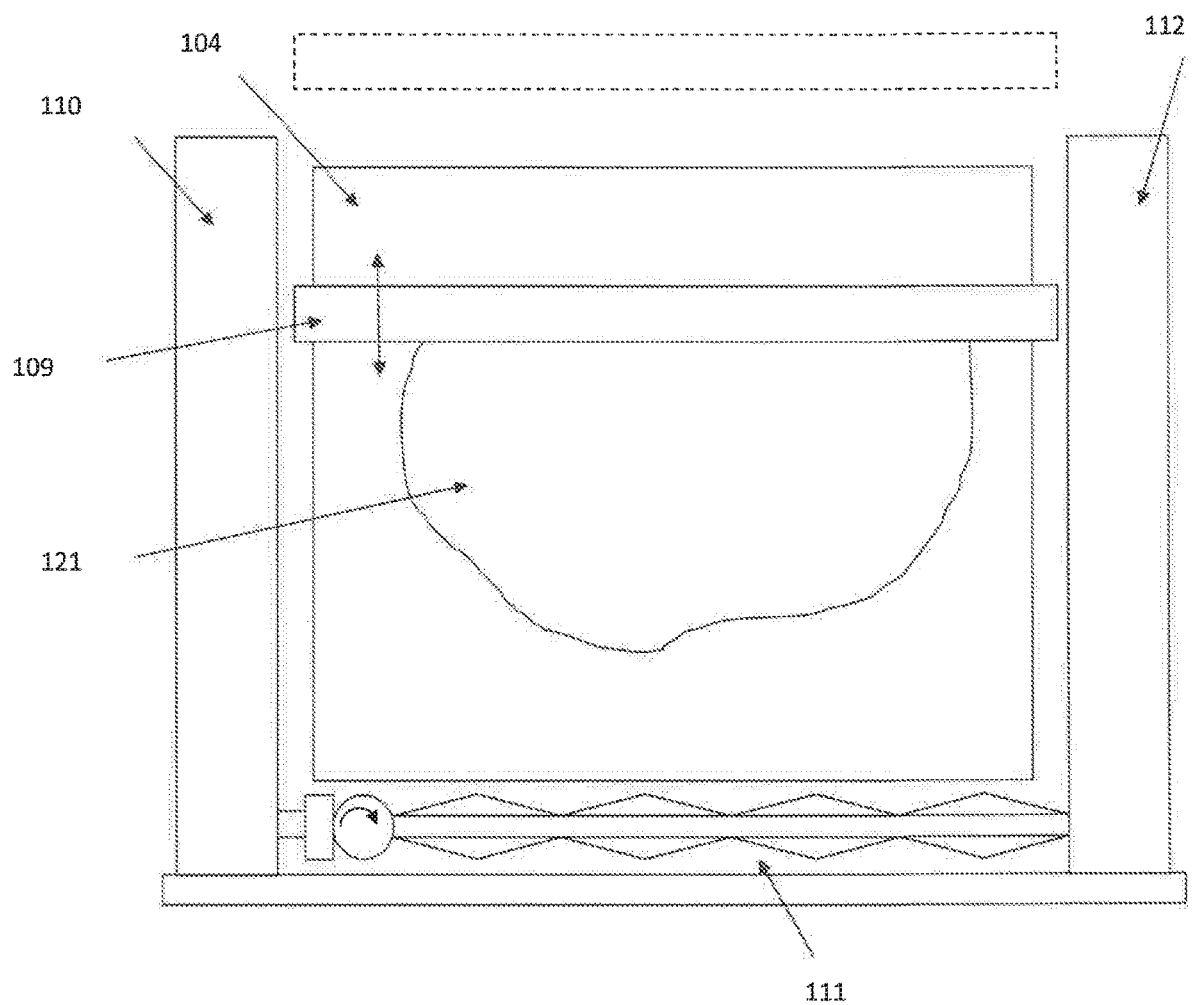
FIG. 4b is a plan view of the gas flow device during deposition of a powder layer using a wiper.

Once a section (layer) 121 of the object has been completed, a further layer of powder is deposited on the powder bed 104. To do this, a wiper 109 moves across the powder bed 104 to spread a fresh layer of powder. In this embodiment, in order for the wiper 109 to pass over the powder bed 104 the nozzle 112 and exhaust 110 must be sufficiently far apart to allow the wiper to pass therebetween. In FIG. 4b, the wiper 109 is shown spreading powder, the position of the wiper 109 during consolidation of the powder shown in dotted lines.

In this embodiment, the nozzle 112 and exhaust 110 have a curved outer surface to reduce disturbance of the gas in the build chamber 101 as the nozzle 112 and exhaust 110 move during consolidation of the powder using the laser beam.

The gas-circulation loop 111, nozzle 112 and exhaust 110 may be arranged to switch the direction of gas flow dependent upon the scanning direction. In such a scenario, the nozzle 112 would thus become the exhaust and the exhaust 110 the nozzle.

Figure 5A:
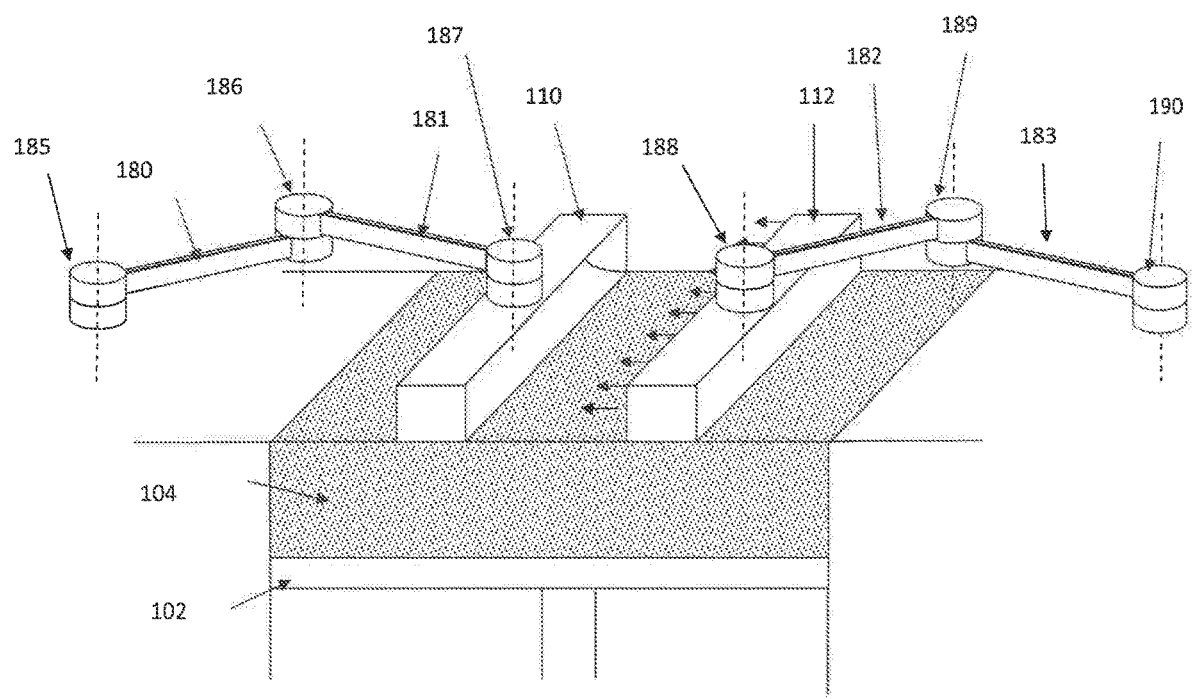
FIG. 5a is a perspective view of another embodiment of the invention comprising a fixed length gas recirculation loop.
Figure 5B:
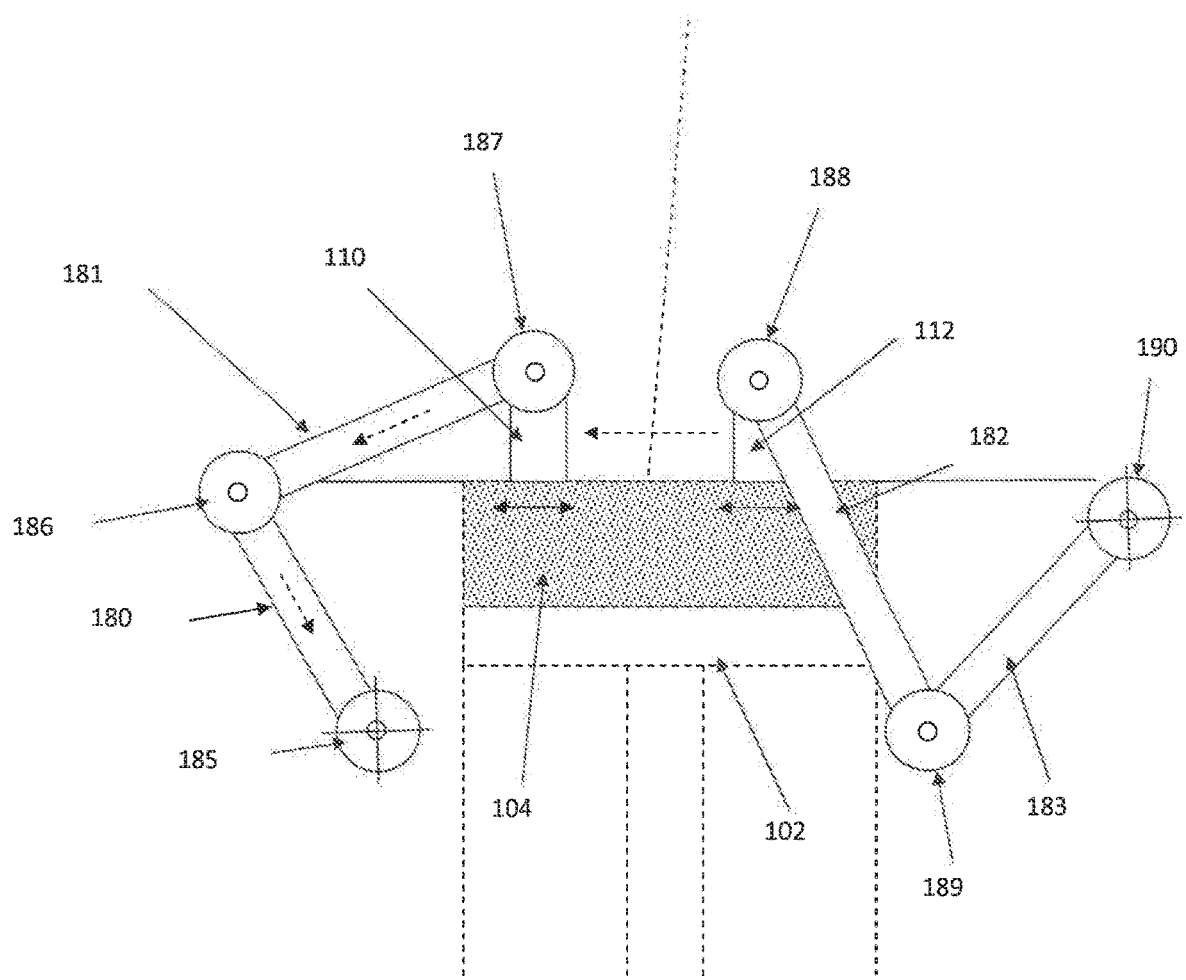
FIG. 5b is a plan view of another embodiment of a fixed length gas recirculation loop.

FIGS. 5a and 5b show alternative embodiments of the recirculation loop having a fixed length to avoid pumping effects for changes in the distance between the nozzle 112 and exhaust 110. In this embodiment, the recirculation loop 111 comprises tubes 180 to 183 for transporting the gas connected to rotary joints 185 to 190 that allow the tubes 180 to 183 to move with movement of the nozzle 112 and exhaust 110. Rotary joints 185 and 190 are fixed relative to the build chamber and rotary joints 187 and 188 are fixed to the nozzle 110 and exhaust 112, respectively. Rotary joints 186 and 189 "float" within the build chamber In FIG. 5a the tubes 180 to 183 move in a horizontally plane with the rotary axes (shown in dotted lines) of the rotary joints 185 to 190 aligned vertically. In FIG. 5b, the tubes 180 to 183 move in a vertical plane with the rotary axes of the rotary joints 185 to 190 aligned horizontally. The tubes 180 to 183 may be connected to filters and a pump of the recirculation loop located outside of the build chamber via an outlet/inlet located at the rotary joints 185, 190 fixed to the build chamber.

The arrangements shown in FIGS. 5a and 5b allow the nozzle 110 and exhaust 112 to move relative to each other whilst ensuring that the length of the recirculation loop 111 remains constant to avoid pumping effects that could occur with a bellows or telescopic tubing arrangement. Locating of the pump and filters external to the build chamber allows the filter to be replaced and maintenance of the pump without having to gain access to the build chamber, which may compromise the integrity of the inert gas atmosphere contained in the build chamber. An advantage of the embodiment of FIG. 5b is that gravity as well as gas flow will drive the debris to the outlet at joint 185, which may prevent clogging of the tubes.

Figure 6A:
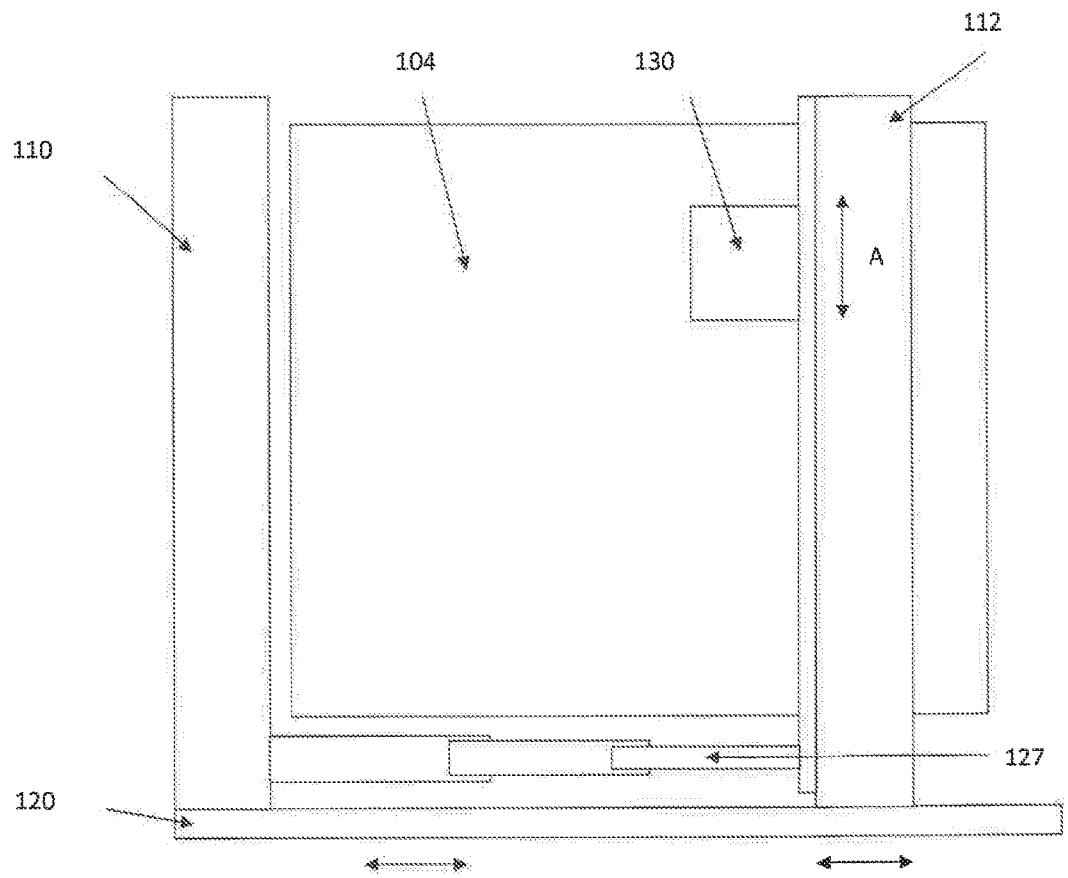
FIGS. 6a and 6b show a further embodiment of a gas flow device according to the invention comprising a metrology device for measuring an attribute of the object being built.
Figure 6B:
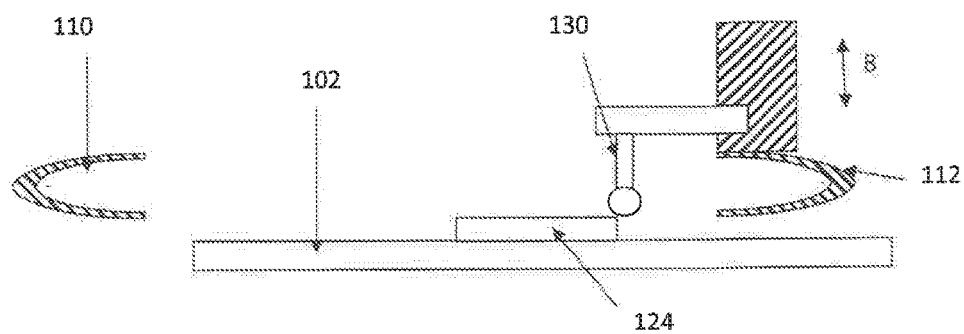

FIGS. 6a and 6b show a further embodiment of the invention, wherein metrology apparatus, in this embodiment a scanning or touch probe 130, is mounted to the nozzle 112 such that it can move in a linear direction along the nozzle 112 (as indicated by the arrows A) and in a vertical direction (as indicated by arrows B). In use, the scanning or touch probe 130 can be moved to measure a hybrid blank or an object being built. The metrology apparatus could be used for initial set-up of the apparatus, for in-process control or for measuring the object post-production. However, piggy-backing off the back of the nozzle 112 reduces the number of axes that are required compared to providing a separate set of axes for the measurement probe. It will be understood that the probe 130 could also be mounted in a like manner on the exhaust 110.

In this embodiment, the bellows arrangement for the recirculation loop 111 has been replaced with telescopic tubes 127.

Figure 7:
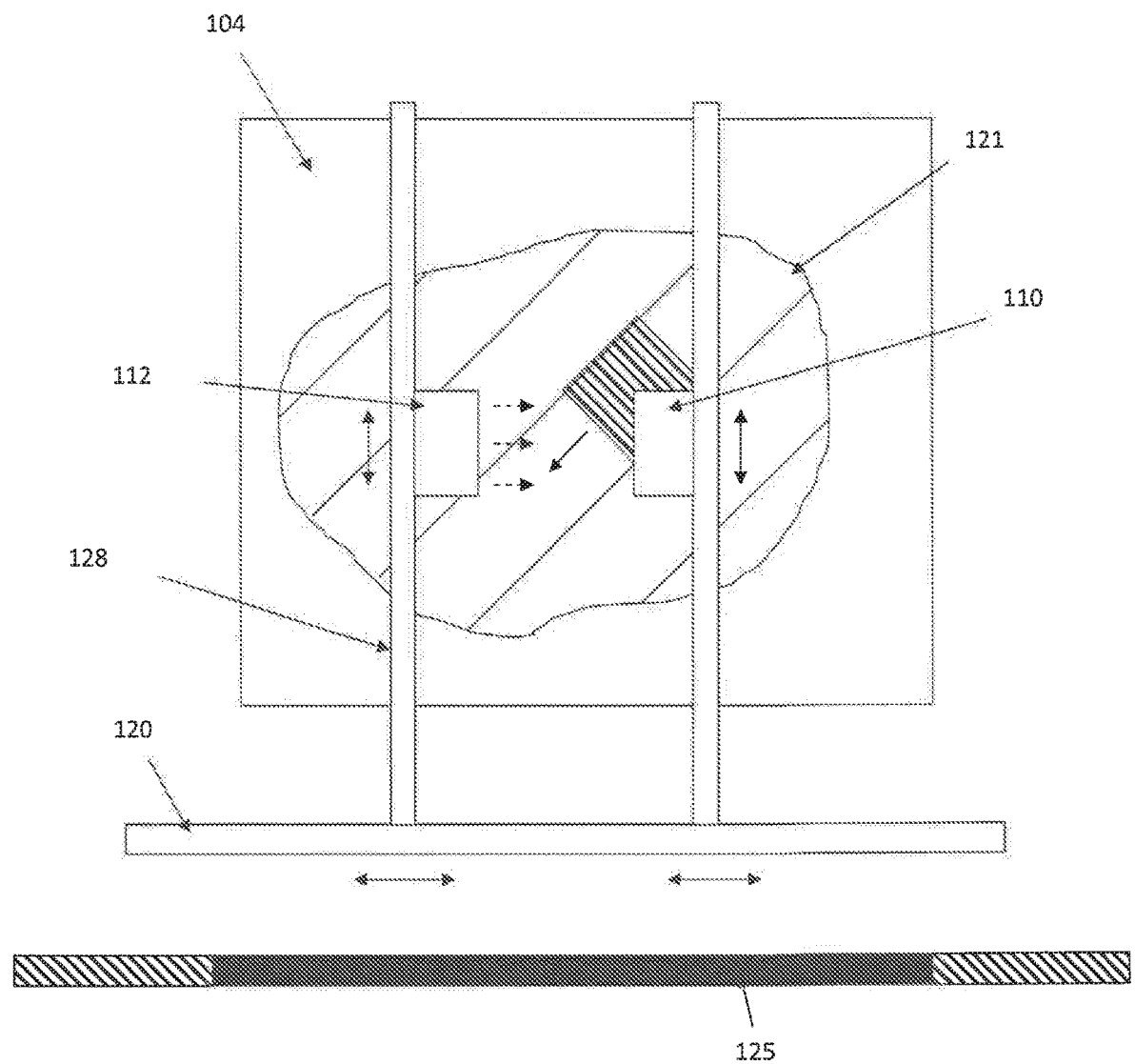
FIG. 7 is a plan view of a gas flow device according to another embodiment of the invention.

FIG. 7 shows a further embodiment, wherein the nozzle 112 and exhaust 110 extend across a partial width of the powder bed 104, with the nozzle 112 and exhaust 110 each mounted for motion along two perpendicular axes.

Figure 8A:
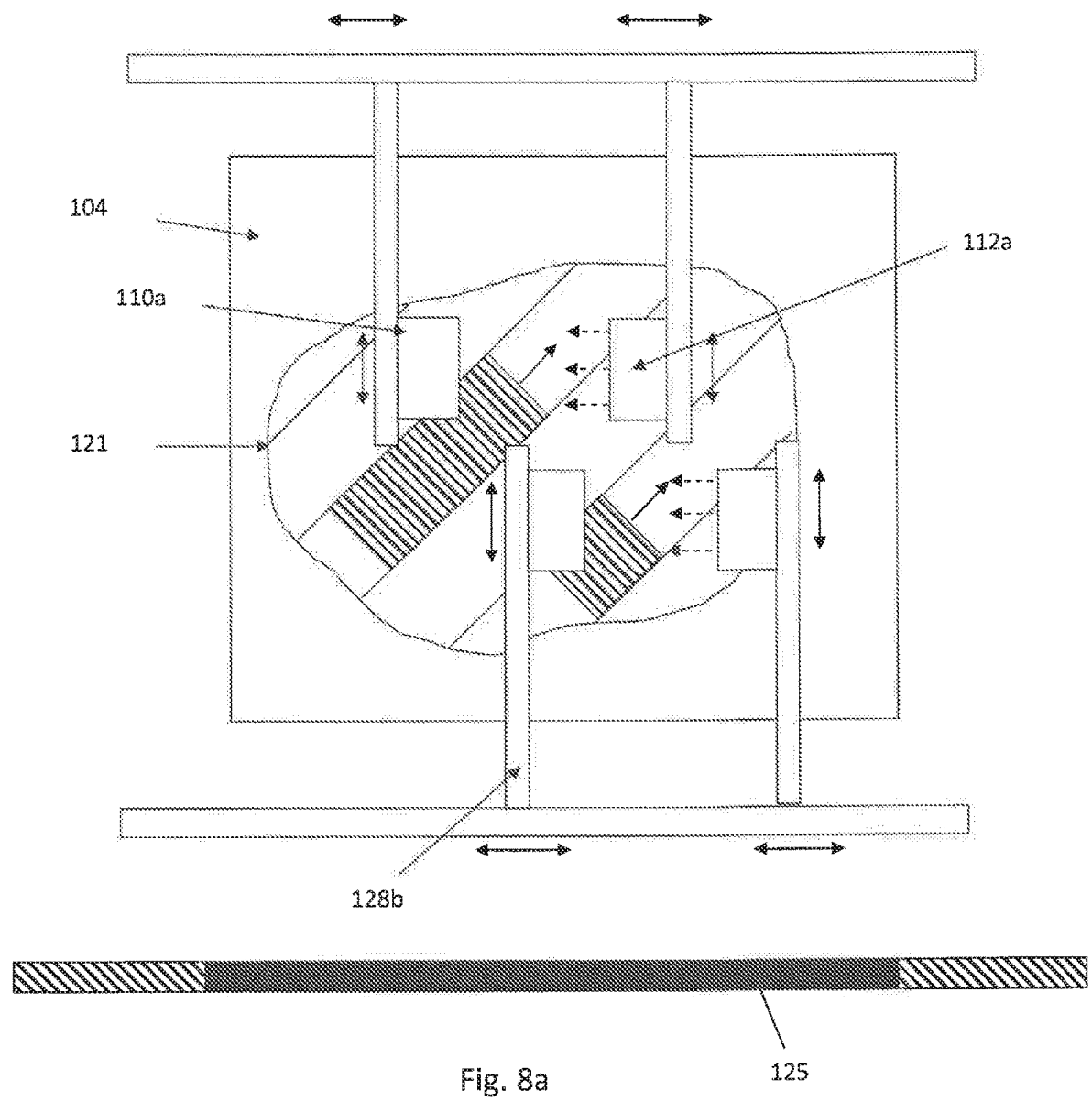
FIG. 8a is a plan view of a gas flow device according to another embodiment of the invention.

FIG. 8a shows a further embodiment, wherein the apparatus comprises multiple pairs of nozzles 112 and exhausts 110, each nozzle 112 and exhaust 110 mounted for motion along two perpendicular axes. Each pair of nozzle 112 and exhaust 110 is arranged to cover a different portion of the build platform 102. An extent of movement of the nozzle 112 and exhaust 110 of each pair in a direction perpendicular to the gas flow direction is limited to less than the entire width of the build platform 102 and, in this embodiment, is limited to half of the width of the build platform 102. Such an arrangement may be useful when the object is to be formed by consolidation of powder simultaneously with two or more laser beams, such as disclosed in DE102005014483 A1 or GB1310276.9.

FIG. 8b shows a variation on an apparatus comprising multiple pairs of nozzles 112 and exhausts 110. In this embodiment, the pairs of nozzles 112 and exhausts 110 are mounted on a common guide 120. Each pair may be arranged to cover a different area of the build platform 104 or may be arranged such that common areas on the build platform can be covered by either pair. The nozzle 112 and exhaust 110 of each pair can move over an entire extent of the build platform 102 in a direction perpendicular to the gas flow direction.

Figure 8C:
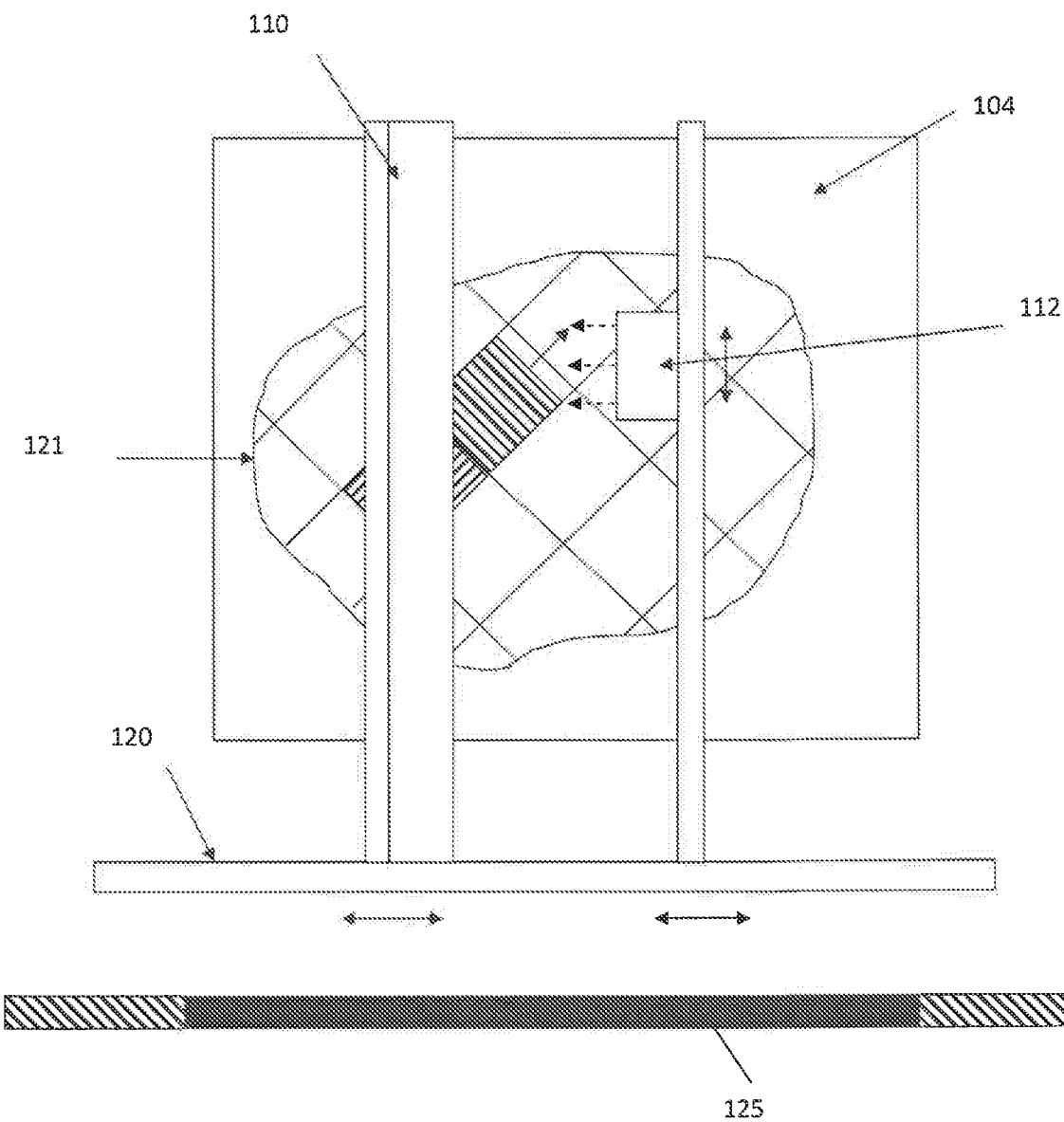
FIG. 8c is a plan view of a gas flow device according to another embodiment of the invention.

In FIG. 8c, the nozzle 112 only extends across a partial width of the powder bed 104 whereas the exhaust 110 extends over a wider region, in this embodiment an entire width, of the build platform 102. It may be desirable to focus the stream of gas from the inlet to a region where the laser beam impacts the powder bed whereas it may be desirable for the exhaust to extend over a much larger region as debris from consolidation of the powder may spread over a larger region of the powder bed than the volume into which gas is directed by the nozzle 112.

Figure 9:
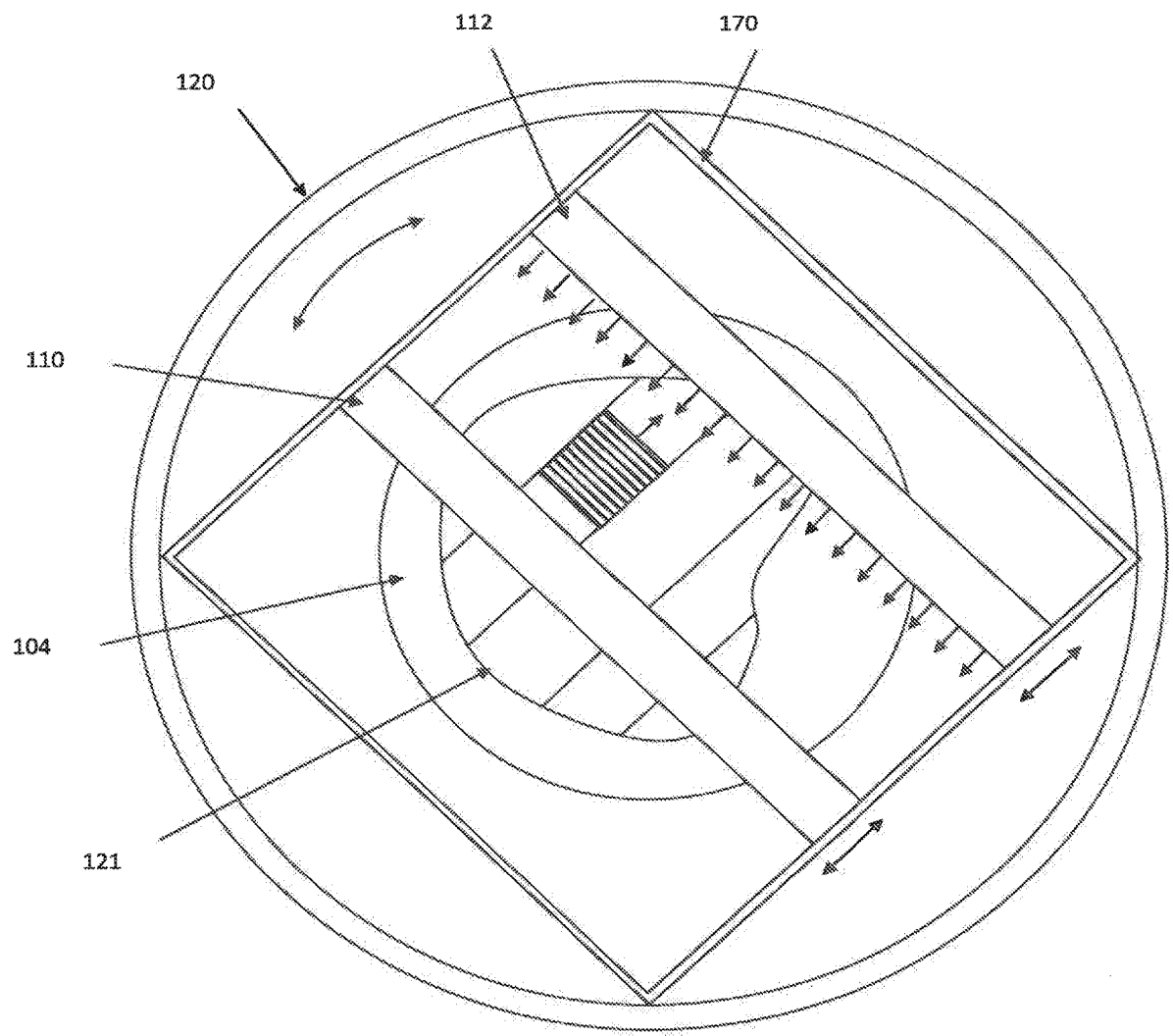
FIG. 9 is a plan view of a gas flow device according to another embodiment of the invention.

FIG. 9 shows a system, wherein the nozzle 112 and exhaust 110 system are mounted for rotary movement about the build platform 104. In this embodiment, the build platform 104 comprises a round upper surface that defines a working area. The nozzle 112 and exhaust 110 are mounted in a frame 170 for independent movement in a linear direction, the frame 170 rotatable in a guide 120 to rotate the nozzle 112 and exhaust 110 around the build platform 104. In this way, both the distance between the nozzle 112 and exhaust 110 can be adjusted together with the direction in which flow is generated across the build platform 104. The gas flow direction may be altered by rotating the nozzle 112 and exhaust 110 as the scanning direction is altered for each layer. For example, the scan direction may be rotated by a set amount between consecutive layers, the flow direction also being rotated by a corresponding amount. The flow direction may be arranged to be substantially parallel to a scan direction or stripe formation direction, by (i) arranging the gas outlet to draw gas in a direction substantially parallel to the working area, and/or (ii) arranging the gas inlet to propel gas in a direction substantially parallel to the working area. An example of scanning of layers in stripes is disclosed in EP1993812.

Figure 10:
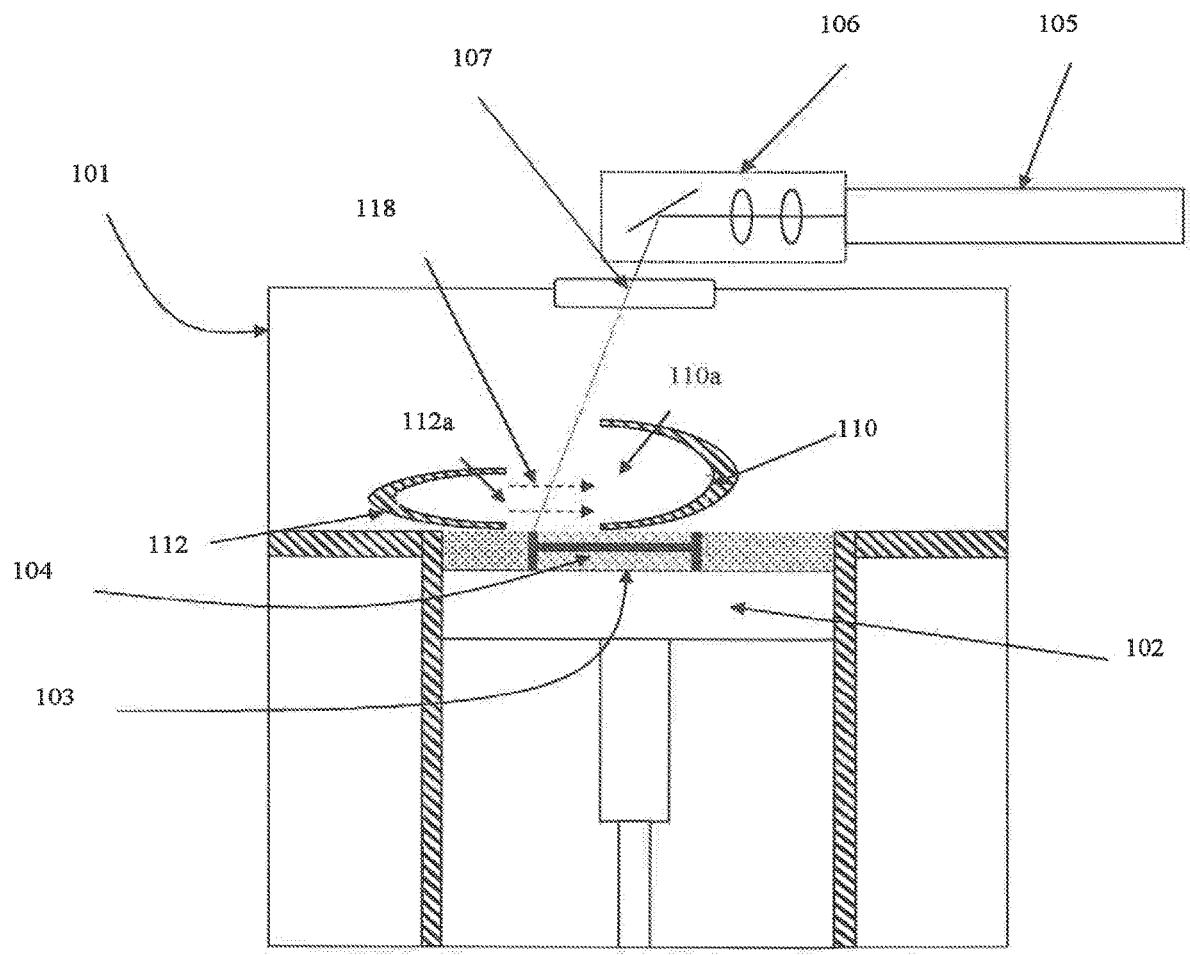
FIG. 10 shows additive manufacturing apparatus according to an embodiment of the invention having a gas flow device with an enlarged gas outlet.

Also, as shown in FIG. 10, the outlet 110a provided by the exhaust 110 may have a greater vertical height than the inlet 112a provided by the nozzle 112. This may prevent condensate from being blown over the exhaust by any turbulence in the gas flow facilitating collection of the splashes generated by the SLM process.

Figure 11A:
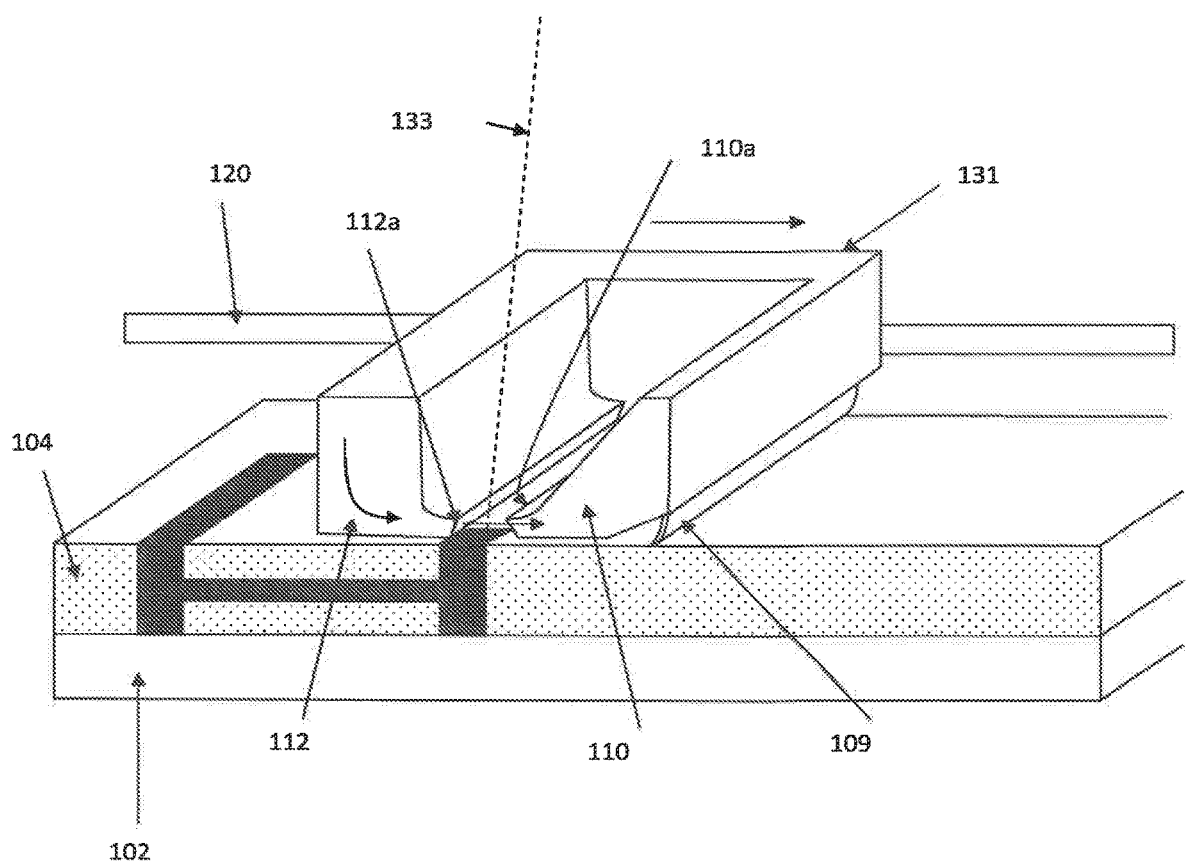
FIG. 11a perspective view of a gas flow device according to another embodiment of the invention.
Figure 11B:
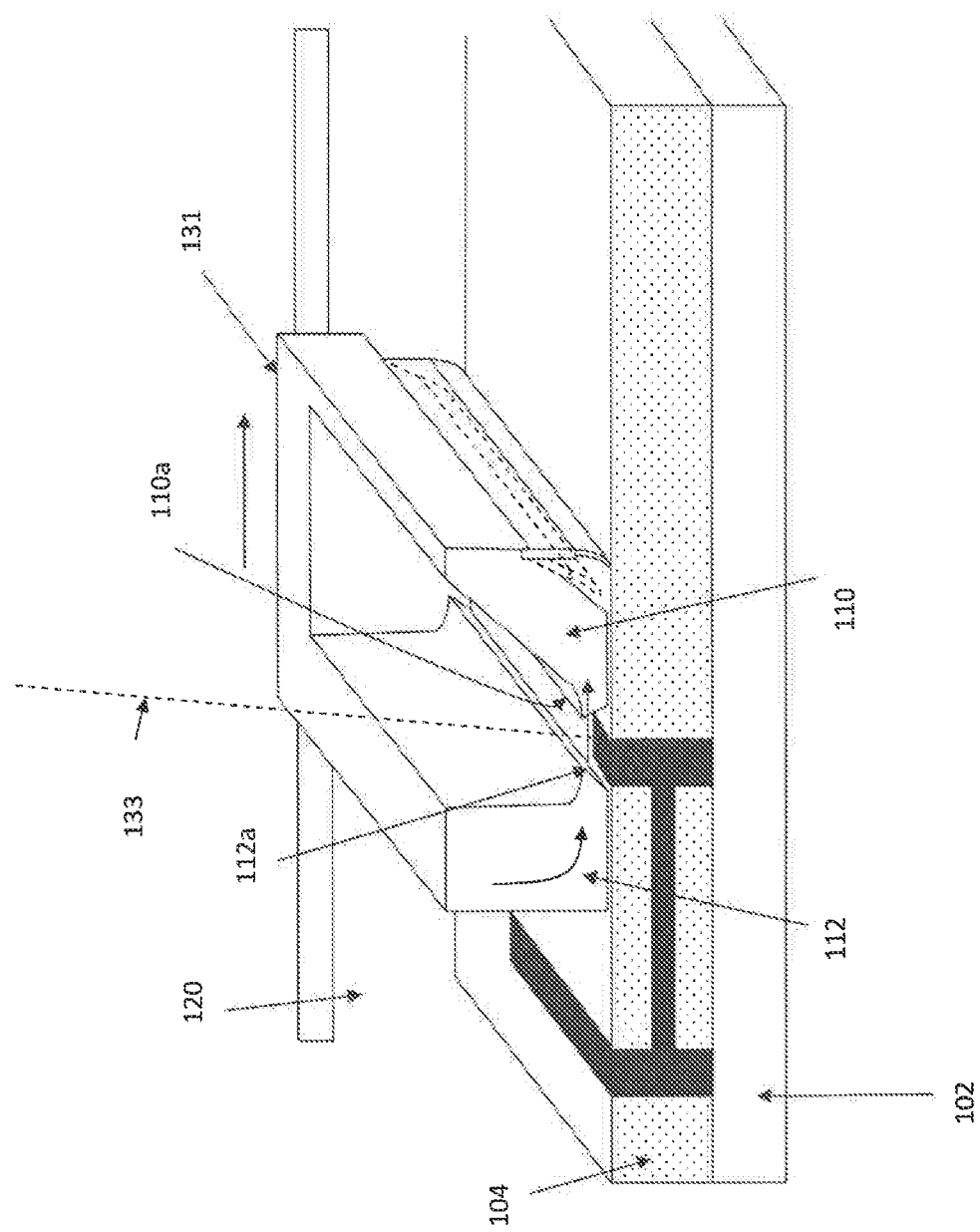
FIG. 11b is a perspective view of a modification to the gas flow device of FIG. 11, wherein the wiper blade is retractable.
Figure 12:
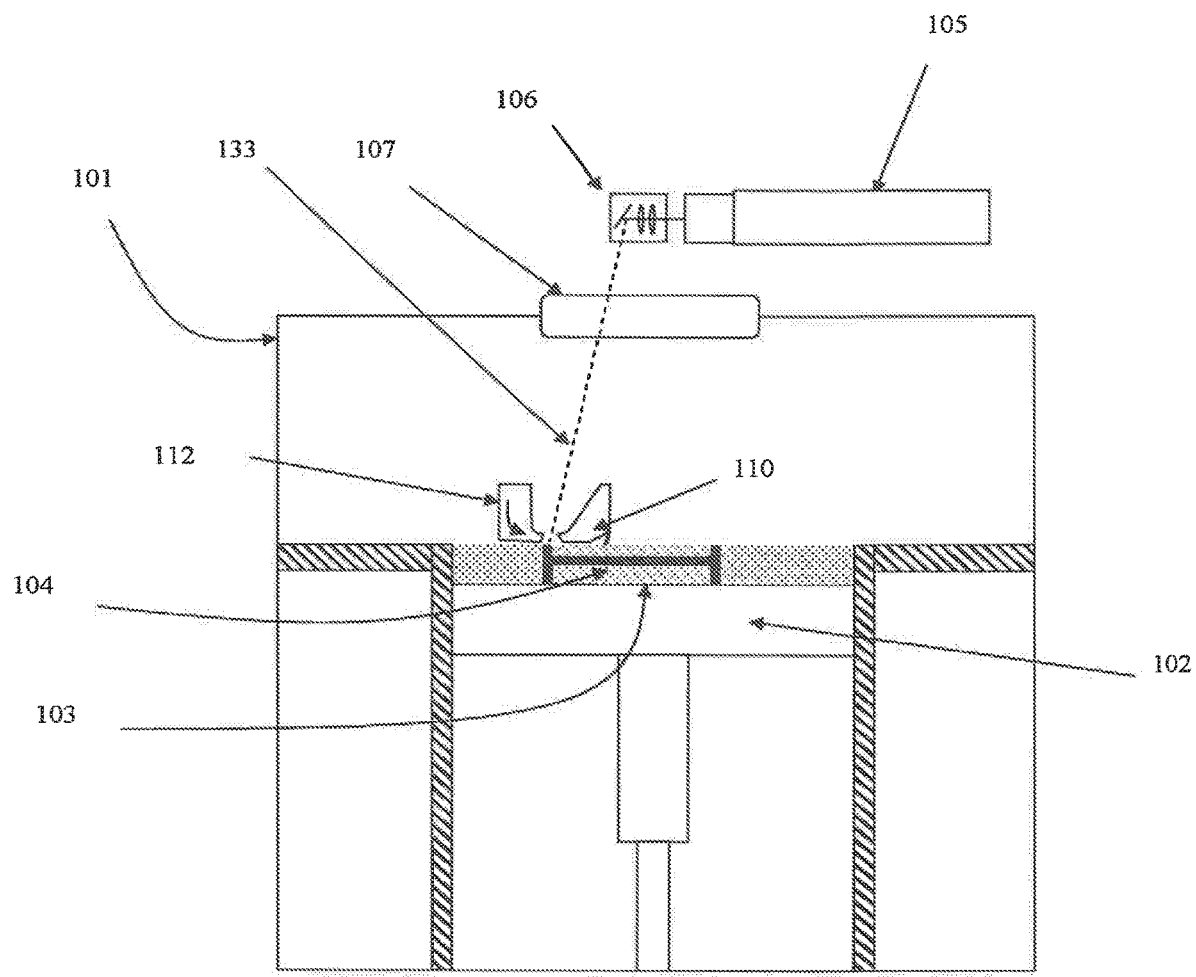
FIG. 12 is a schematic view of an additive manufacturing apparatus comprising the flow device shown in FIG. 11.
Figure 13:
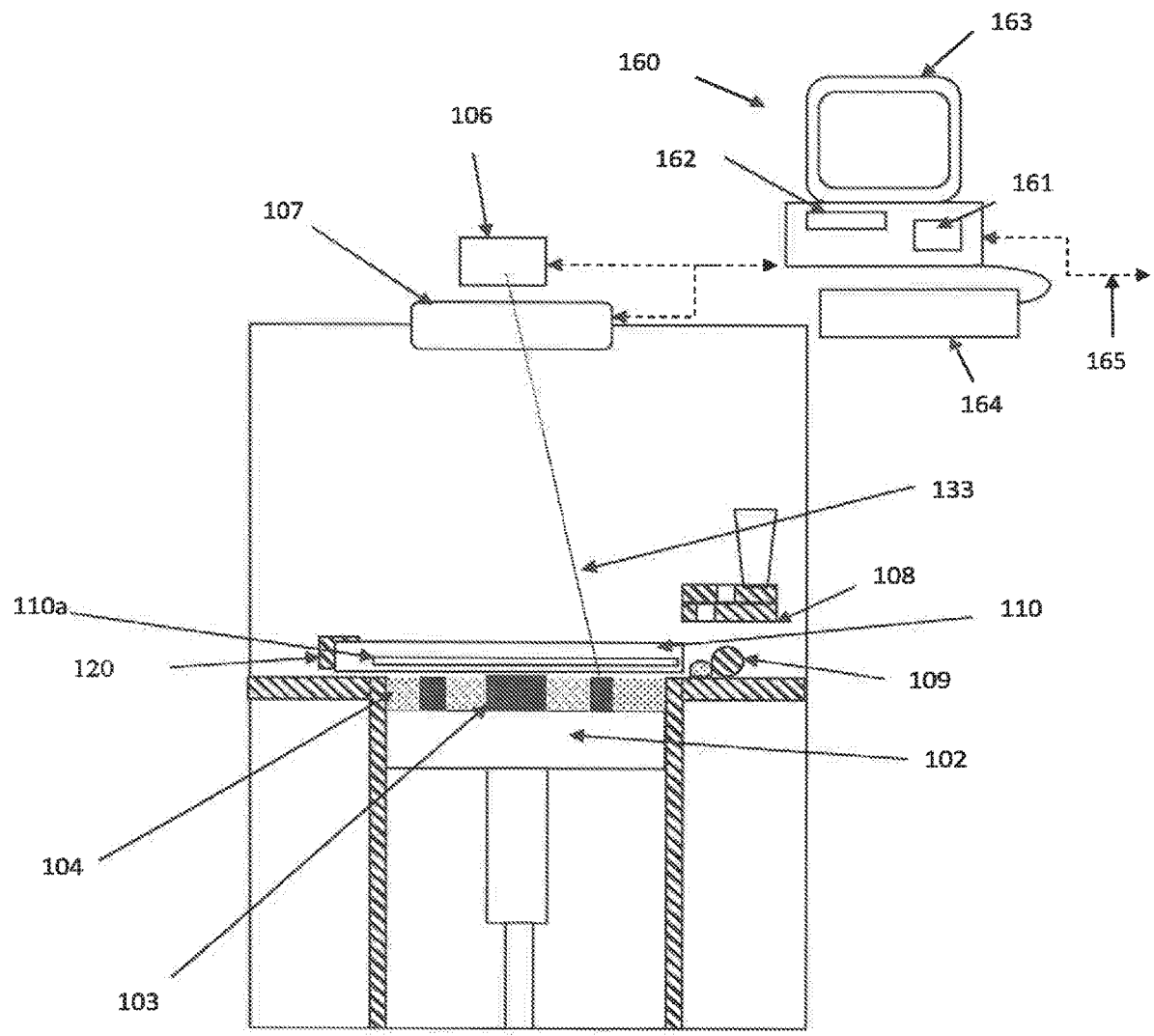
FIG. 13 is a schematic view of the additive manufacturing apparatus shown in FIG. 12 from a different side.

FIGS. 11 to 13 show an alternative embodiment of a flow device 131 wherein the nozzle 112 and exhaust 110 are formed as a single movable unit 131 with a fixed distance between the gas inlet 112a and gas outlet 110a. In this embodiment, the wiper 109 is fixed to the unit 131 and the powder spread across the powder bed 104 simultaneously with movement of the unit 131. In FIG. 11a the wiper 109 is fixed in relation to the nozzle 112 and exhaust 110. However, in FIG. 11b, the wiper 109 is movable from an extended position 109a in which the wiper engages the powder for spreading the powder across the build platform 104 and a retracted position 109b in which the unit 131 can move over the build platform 104 without the wiper 109 engaging the powder.

The optical unit 106 is controlled to direct the laser beam 133 into the gap between the gas inlet 112a and gas outlet 110a to consolidate powder therebetween. In use, the unit 131 is moved along the guide 120 (by suitable motors (nut shown)) to traverse the powder bed, the laser beam 133 being directed by the optical module 106 to scan between the gap as the unit 131 traverses the powder bed. Switching of the laser beam 133 on and off as the laser beam scans across the gap allows areas of the powder bed 104 to be selectively consolidated. The embodiment shown in FIG. 11b with a retractable wiper 109 may allow the unit 131 to traverse over the build platform 104 two or more times before spreading of the next layer of powder. For example, a retractable wiper may be beneficial if adjacent areas of the powder are to be scanned by the laser beam during separate traverses of the powder bed by the flow device 131 in order to manage heating of the powder bed. For example, a stripe pattern, such as shown in FIG. 3, may be used as a scanning strategy for forming the part, with adjacent stripes scanned during different traverses of the powder bed by the flow device 131.

Figure 14:
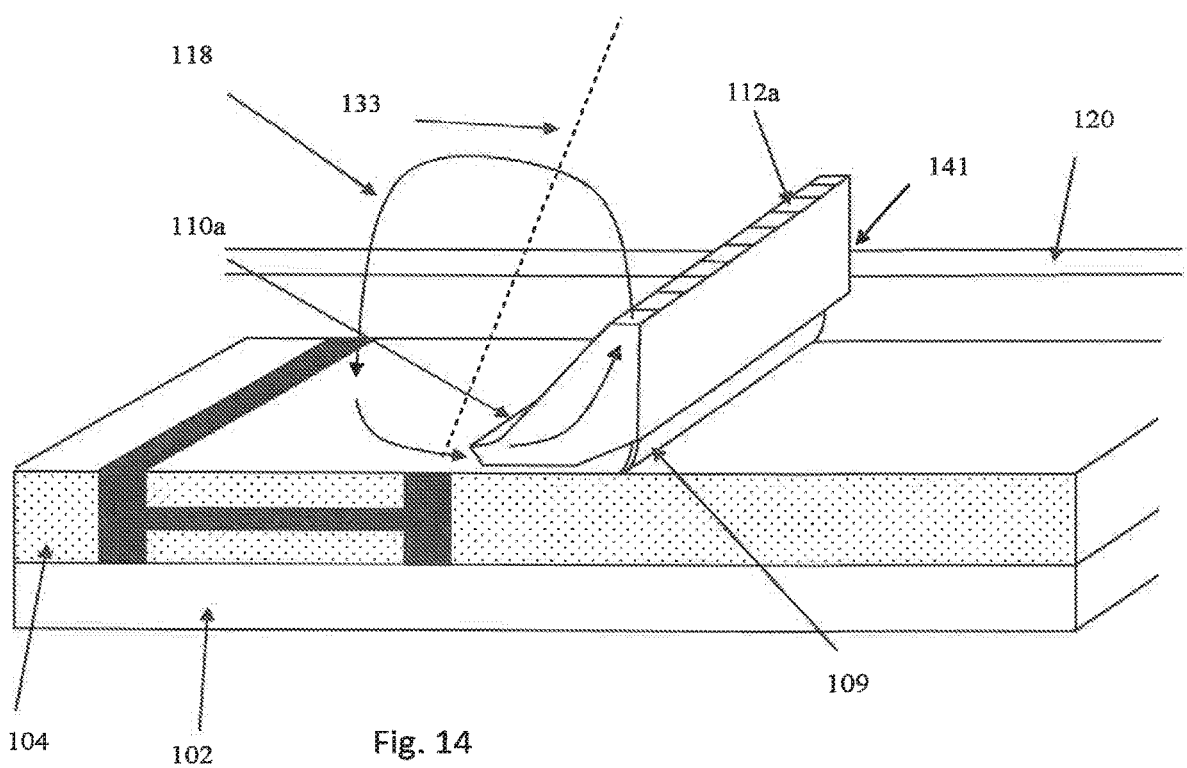
FIG. 14 is a perspective view of a gas flow device according to another embodiment of the invention.

FIG. 14 shows a movable flow device 141 according to another embodiment of the invention. In this embodiment, the flow device 141 comprises a gas outlet 110a for drawing gas from the chamber 101 that is located in the vicinity of the powder bed 104 and a gas inlet 112a for propelling gas into the chamber 101 that is located (relative to the outlet 110a) remote from the powder bed 104. In this embodiment, the inlet 112a propels gas upwards into the chamber 101. The action of the sucking of gas into outlet 110a and the propelling of gas out of gas inlet 110a may generate a circulation of inert gas in the chamber 101 in the vicinity of the flow device 141, such that the gas inlet is arranged to propel gas in a direction that is not substantially parallel to the working area. Housed within the flow device 141 is a filter not shown) for filtering particles from the gas flow before the gas is propelled back into the build chamber through inlet 112a.

In use, the optical unit 106 is controlled to direct the laser beam 133 to a location close to the gas outlet 110a such that condensate generated by the consolidation of powder 104 is removed in the gas flow generated by the outlet 112a. The unit 141 is moved along the guide 120 (by suitable motors (not shown)) to traverse the powder bed 104, the laser beam 133 being directed by the optical module 106 to scan just behind or in front of the gas outlet 110a as the unit 131 traverses the powder bed 104. Switching of the laser beam 133 on and off as the laser beam scans the powder bed allows areas of the powder bed 104 to be selectively consolidated.

FIG. 15 is a flow device 151 like that shown in FIG. 14, but with a gas flow guide 152 added to direct the flow of gas to the gas outlet 110a. The gas flow guide 152 is mounted to move with the flow device 151 and may be connected to the flow device 151 so as to move therewith. The flow guide 152 may have an appropriate shape, such as a scoop shape or planar surface, which directs gas from an upper region in the chamber 101 to a lower region adjacent the outlet 110a.

In a further embodiment (not shown), rather than the inlet 112a of the flow device being movable with the outlet 110a, the inlet 112a may be located at a fixed location within the chamber 101.

It will be understood that alterations and modifications can be made to the above described embodiments without departing from the scope of the invention as described herein. In particular, features described with reference to one embodiment may be combined with features described with reference to another embodiment. For example, the flow devices described with reference to FIGS. 11 to 15 may extend across an entire width of the powder bed 104 or may extend across a partial width of the powder bed and be mounted to move in two perpendicular directions, as shown in FIGS. 7 to 9.

The invention claimed is:

1. An additive manufacturing apparatus for building objects by layerwise consolidation of material, the apparatus comprising:
    a build chamber containing a build platform that defines a working area,
    a laser module configured to generate a laser beam,
    an optical module configured to direct the laser beam to a working area to consolidate material deposited in the working area in layers,
    a first flow device comprising a gas inlet configured to propel gas into a volume above the working are, and
    a second flow device comprising an elongate gas outlet configured to draw gas from the volume so as to generate a gas flow between the gas inlet and gas outlet, wherein the second flow device is arranged to be movable within the build chamber during the build, and the elongate gas outlet extends across an entire width of the working area, the second flow device movable in a linear direction transverse to a longitudinal axis of the elongate gas outlet.

2. An additive manufacturing apparatus for building objects by layerwise consolidation of material, the apparatus comprising:

a build chamber containing a working area, a laser module configured to generate a laser beam, an optical module configured to direct the laser beam to a working area to consolidate material deposited in the working area in layers, a first flow device comprising a gas inlet configured to propel gas into a volume above the working area, and a second flow device comprising a gas outlet configured to draw gas from the volume so as to generate a gas flow between the gas inlet and gas outlet, wherein the second flow device is arranged to be movable within the build chamber during the build and the gas inlet is located at a fixed location within the build chamber.

3. An additive manufacturing apparatus for building objects by layerwise consolidation of material, the apparatus comprising:

a build chamber containing a build platform that defines a working area, a laser module configured to generate a laser beam, an optical module configured to direct the laser beam to a working area to consolidate material deposited in the working area in layers, a first flow device comprising an elongate gas inlet to propel gas into a volume above the working area, and a second flow device comprising a gas outlet to draw gas from the volume so as to generate a gas flow between the gas inlet and gas outlet, wherein the first flow device is arranged to be movable within the build chamber during the build, and the elongate gas inlet extends across an entire width of the working area, the first flow device movable in a linear direction perpendicular to a longitudinal axis of the elongate gas inlet.

4. An additive manufacturing apparatus according to claim 3, wherein the gas outlet comprises an elongate gas outlet that extends across an entire width of the working area.

5. An additive manufacturing apparatus according to claim 1, comprising a gas flow device configured to control the gas flow through the gas inlet and/or gas outlet based upon a distance between the gas inlet and gas outlet.

6. An additive manufacturing apparatus according to claim 1, wherein the first flow device and second flow device are arranged to be movable together such that relative positions of the gas inlet and gas outlet remain fixed.

7. An additive manufacturing apparatus according to claim 1, wherein the second flow device is movable such that a distance between the gas inlet and gas outlet is less than a width of a working area in which an object is built.

8. An additive manufacturing apparatus according to claim 1, comprising a control unit configured to control scanning of the material with the laser beam in accordance with a predetermined scanning plan and controlling movement of the second flow device based upon the scanning plan.

9. An additive manufacturing apparatus according to claim 1, wherein the gas inlet is located at a fixed location within the build chamber.

10. An additive manufacturing apparatus according to claim 1, wherein the gas inlet comprises an elongate gas inlet that extends across an entire width of the working area.

11. An additive manufacturing apparatus according to claim 10, wherein the gas inlet is located at a fixed location within the build chamber.

12. An additive manufacturing apparatus according to claim 3, comprising a gas flow device configured to control the gas flow through the gas inlet and/or gas outlet based upon a distance between the gas inlet and gas outlet.

13. An additive manufacturing apparatus according to claim 3, wherein the first flow device and second flow device are arranged to be movable together such that relative positions of the gas inlet and gas outlet remain fixed.

14. An additive manufacturing apparatus according to claim 3, wherein the first flow device is movable such that a distance between the gas inlet and gas outlet is less than a width of a working area in which an object is built.

15. An additive manufacturing apparatus according to claim 3, comprising a control unit configured to control scanning of the material with the laser beam in accordance with a predetermined scanning plan and controlling movement of the first flow device based upon the scanning plan.

16. An additive manufacturing apparatus according to claim 2, comprising a gas flow device configured to control the gas flow through the gas inlet and/or gas outlet based upon a distance between the gas inlet and gas outlet.

17. An additive manufacturing apparatus according to claim 2, comprising a control unit configured to control scanning of the material with the laser beam in accordance with a predetermined scanning plan and controlling movement of the second flow device based upon the scanning plan.

* * * * *